US009069747B2

(12) United States Patent
Ueberschaer et al.

(10) Patent No.: US 9,069,747 B2
(45) Date of Patent: Jun. 30, 2015

(54) METHODS, APPARATUS, SYSTEMS AND COMPUTER READABLE MEDIUMS FOR USE IN ASSOCIATION WITH ELECTRONIC SPREADSHEETS

(75) Inventors: Thorsten Ueberschaer, Ketsch (DE); Gilbert Karbach, Gross-Gerau (DE)

(73) Assignee: SAP SE, Walldorf (DE)

( * ) Notice: Subject to any disclaimer, the term of this patent is extended or adjusted under 35 U.S.C. 154(b) by 662 days.

(21) Appl. No.: 12/869,434

(22) Filed: Aug. 26, 2010

(65) Prior Publication Data

US 2012/0054591 A1 Mar. 1, 2012

(51) Int. Cl.
*G06F 17/00* (2006.01)
*G06F 17/24* (2006.01)

(52) U.S. Cl.
CPC ................... *G06F 17/246* (2013.01)

(58) Field of Classification Search
CPC ..................................................... G06F 17/246
USPC .................................................. 715/212, 220
See application file for complete search history.

(56) References Cited

U.S. PATENT DOCUMENTS

| | | | |
|---|---|---|---|
| 4,989,141 A | 1/1991 | Lyons et al. | |
| 5,165,012 A | 11/1992 | Crandall et al. | |
| 5,189,608 A | 2/1993 | Lyons et al. | |
| 5,233,513 A | 8/1993 | Doyle | |
| 5,247,611 A | 9/1993 | Norden-Paul et al. | |
| 5,255,356 A * | 10/1993 | Michelman et al. | 715/217 |
| 5,293,615 A | 3/1994 | Amada | |
| 5,303,146 A | 4/1994 | Ammirato et al. | |
| 5,319,777 A | 6/1994 | Perez | |
| 5,321,803 A | 6/1994 | Ditter, Jr. | |
| 5,359,724 A | 10/1994 | Earle | |
| 5,371,675 A | 12/1994 | Greif et al. | |
| 5,381,332 A | 1/1995 | Wood | |

(Continued)

FOREIGN PATENT DOCUMENTS

EP    0 997 834 A2    5/2000

OTHER PUBLICATIONS

Sestoft, "A Spreadsheet Core Implementation in C#", IT University Technical Report Series TR-2006-91, Sep. 2006, Copyright 2006 Peter Sestoft, IT University of Copenhagen, 138 pages.*

(Continued)

*Primary Examiner* — Amelia Tapp
(74) *Attorney, Agent, or Firm* — Buckley, Maschoff & Talwalkar LLC

(57) ABSTRACT

In one embodiment, a method comprises: providing an electronic spreadsheet having a plurality of cells arranged in an array having a plurality of rows and a plurality of columns; receiving information defining a plurality of items, each of the plurality of items representing a respective set of data usable in populating at least a portion of the plurality of cells of the electronic spreadsheet, at least one of the plurality of items including a table having a plurality of rows and a plurality of columns; associating each of the plurality of items with a respective location in the electronic spreadsheet; associating each of the plurality of items with a respective position in a stack, each of the plurality of items being able to be associated with any position in the stack; and rendering the electronic spreadsheet in accordance with the information defining the plurality of items, the respective location associated with each item and the respective stack position associated with each item.

33 Claims, 16 Drawing Sheets

(56) References Cited

U.S. PATENT DOCUMENTS

| | | | |
|---|---|---|---|
| 5,390,296 A | | 2/1995 | Crandall et al. |
| 5,444,842 A | | 8/1995 | Bentson et al. |
| 5,572,644 A | * | 11/1996 | Liaw et al. .............. 715/209 |
| 5,588,099 A | | 12/1996 | Mogilevsky et al. |
| 5,604,854 A | * | 2/1997 | Glassey .................. 715/209 |
| 5,682,526 A | | 10/1997 | Smokoff et al. |
| 5,701,499 A | | 12/1997 | Capson et al. |
| 5,727,161 A | | 3/1998 | Purcell, Jr. |
| 5,734,889 A | | 3/1998 | Yamaguchi |
| 5,778,408 A | | 7/1998 | Valentine |
| 5,799,286 A | | 8/1998 | Morgan et al. |
| 5,806,078 A | | 9/1998 | Hug et al. |
| 5,819,293 A | | 10/1998 | Comer et al. |
| 5,852,819 A | | 12/1998 | Beller |
| 5,883,623 A | | 3/1999 | Cseri |
| 5,893,123 A | | 4/1999 | Tuinenga |
| 5,893,124 A | | 4/1999 | Ogaki et al. |
| 5,913,032 A | | 6/1999 | Schwartz et al. |
| 5,933,830 A | | 8/1999 | Williams |
| 5,960,415 A | | 9/1999 | Williams |
| 5,991,741 A | | 11/1999 | Speakman et al. |
| 6,006,239 A | | 12/1999 | Bhansali et al. |
| 6,026,459 A | | 2/2000 | Huppenthal |
| 6,055,548 A | | 4/2000 | Comer et al. |
| 6,073,107 A | | 6/2000 | Minkiewicz et al. |
| 6,076,152 A | | 6/2000 | Huppenthal et al. |
| 6,088,702 A | | 7/2000 | Plantz et al. |
| 6,115,690 A | | 9/2000 | Wong |
| 6,128,602 A | | 10/2000 | Northington et al. |
| 6,138,130 A | | 10/2000 | Adler et al. |
| 6,173,322 B1 | | 1/2001 | Hu |
| 6,185,582 B1 | * | 2/2001 | Zellweger et al. .......... 715/212 |
| 6,192,408 B1 | | 2/2001 | Vahalia et al. |
| 6,317,750 B1 | | 11/2001 | Tortolani et al. |
| 6,341,282 B1 | | 1/2002 | Sharpe et al. |
| 6,393,410 B1 | | 5/2002 | Thompson |
| 6,408,292 B1 | | 6/2002 | Bakalash et al. |
| 6,411,959 B1 | | 6/2002 | Kelsey |
| 6,434,568 B1 | | 8/2002 | Bowman-Amuah |
| 6,519,571 B1 | | 2/2003 | Guheen et al. |
| 6,539,403 B2 | | 3/2003 | Cho et al. |
| 6,550,056 B1 | | 4/2003 | Mizumoto et al. |
| 6,604,046 B1 | | 8/2003 | Van Watermulen et al. |
| 6,615,202 B1 | | 9/2003 | Ding et al. |
| 6,694,309 B2 | | 2/2004 | Cho et al. |
| 6,701,485 B1 | | 3/2004 | Igra et al. |
| 6,742,015 B1 | | 5/2004 | Bowman-Amuah |
| 6,754,677 B1 | | 6/2004 | Cho et al. |
| 6,917,962 B1 | | 7/2005 | Cannata et al. |
| 6,985,895 B2 | | 1/2006 | Witkowski et al. |
| 7,082,569 B2 | | 7/2006 | Voshell |
| 7,155,665 B1 | | 12/2006 | Browne et al. |
| 7,289,964 B1 | | 10/2007 | Bowman-Amuah |
| 7,370,271 B2 | | 5/2008 | Killen et al. |
| 7,610,294 B2 | * | 10/2009 | Borgsmidt .................. 1/1 |
| 7,624,339 B1 | * | 11/2009 | Engel et al. .............. 715/214 |
| 7,774,695 B2 | * | 8/2010 | Kobylinski .............. 715/227 |
| 9,009,584 B2 | * | 4/2015 | Lo et al. .................. 715/214 |
| 2002/0091728 A1 | * | 7/2002 | Kjaer et al. .............. 707/503 |
| 2002/0103825 A1 | * | 8/2002 | Bauchot ................. 707/504 |
| 2007/0130503 A1 | | 6/2007 | Voshell |
| 2008/0140696 A1 | * | 6/2008 | Mathuria ................. 707/102 |
| 2009/0187815 A1 | * | 7/2009 | Becerra et al. ............ 715/212 |
| 2009/0187816 A1 | * | 7/2009 | Aureglia et al. .......... 715/218 |
| 2009/0313287 A1 | * | 12/2009 | Koralski ................. 707/102 |
| 2010/0257439 A1 | | 10/2010 | Xue et al. |

OTHER PUBLICATIONS

Hallberg et al., "Special Edition Using Microsoft Excel 97, Bestseller Edition", Oct. 16, 1997, ISBN-10: 0-7897-1399-3, ISBN-13: 978-0-7897-1399-5, Que, pp. 1-10 + 1 cover page (total 11 pages).

"DSstar: Hyperion Ships Essbase OLAP Server 6", Apr. 4, 2000, DSstar, pp. 1-4, http://www.taborcommunications.com/dsstar/00/0404/101453.html.

Hyperion, "Hyperion Essbase Release 6 Spreadsheet Add-In User's Guide for Excel", 2000, Hyperion Solutions Corporation, pages: cover pages (2pgs) + table of contents (pp. iii-vi (4pgs) + pp. 2-39-3-57 (98 total pages).

DSstar, "DSstar, Apr 4, 2000: vol. 4, No. 14", Apr. 4, 2000, vol. 4, No. 14, pp. 1-5, http: www.taborcommunications.com/dsstar/00/0404000404.html.

Moseley et al., "Mastering Microsoft Office 97", 1997, Sybex, 2nd Edition, pp. 517-520 + 3 cover pages (7 total pages).

Patterson et al., "Computer Organization and Design", 1998, Morgan Kaufmann Publishers, 2nd Edition, pp. 540-550 + 2 cover pages (13 total papes).

"Canadian Office Action", dated Sep. 13, 2010, for Canadian Patent Application No. 2,367,625, 6pgs.

"I*Net Budgeting—The Web Enabled Budgeting Solution from SRC", 2000, download from http://www.srcsoftware.com/inet_bud.htm, 1pg.

Internet Article, "Getting Started with OLAP@Work for Microsoft Excel", OLAP@Work Inc., 1999, Version 1.5, XP-002224233, retrieved on Dec. 9, 2002, retrieved from the Internet: <URL:http://www.grovemarketing.ca/pdf/Simp_GS.PDF>, 25pgs.

Madan Sheina, "OutlookSoft's Everest: A Collaborative Portal for Enterprise Budgeting", Internet Article, The Aberdeen Group Impact Report, Online!, Aug. 5, 2000, XP-002224236, retrieved on Dec. 9, 2002, retrieved from the Internet: <URL:http://web.archive.org/web/20021209072834/http://www.outlooksoft.com/whitepapers/OS_aberdeen.pdf>, 2pgs.

Nigel Pendse, OLP Omnipresent, BYTE, Online!, Feb. 1998, XP-002224235, retrieved on Dec. 9, 2002, retrieved from the Internet:<URL:http://www.byte.com/art/9802/sec6/art7.htm>, 12pgs.

"Applix TM1 Perspectives", Applix Accelerating Enterprises, Mar. 1999, XP-002224231, retrieved on Dec. 9, 2002, retrieved from the Internet: <URL:http://www.klesse.de/res/pdf_tm1perspectives.pdf>, Kapitel 4: Arbeitsblatter fur die Datenanalyse verwenden, (pp. 4-1 + pp. 4-36, total 45 pages).

European Search Report, dated Jan. 2, 2003, for European Application No. 02000870.2-2201, 3pgs.

"PCT International Search Report of the International Searching Authority", dated Jun. 4, 2002, for PCT/US02/00918, 7pgs.

* cited by examiner

| FILE | EDIT | VIEW | INSERT | | |
|---|---|---|---|---|---|
| | | | | | |
| | REGION CODE | NET SALES-PLAN | NET SALES *1,000 | SALES PLAN *1,000 $ | |
| | OVERALL RESULT | * | | 5,910,245 | 222 |
| | [+] ATLANTA | 610.00 | 0.61 | | 224 |
| | [+] CENTRAL | 1,755,028,359.00 | 1,755,028.36 | | 226 |
| | [+] CHICAGO | 1,530.00 | 1.53 | | 228 |
| | [+] MONTREAL | 330.00 | 0.33 | | 230 |
| | [+] NORTH EAST | 477,183,573.00 | 477,183.57 | | 232 |
| | [+] SOUTH EAST | 2,903,598,389.00 | 2,903,598.39 | | 234 |
| | [+] TORONTO | 1,260.00 | 1.26 | | 236 |
| | [+] WEST | 797,445,899.00 | 797,445.90 | | 238 |
| | [+] NOT ASSIGNED | 5,910,245,353.00 | | 5,910,245 | 240 |

| | A | B | C | D | E | F | G | H | I | J |
|---|---|---|---|---|---|---|---|---|---|---|
| 1 | FILE | EDIT | VIEW | INSERT | | | | | | |
| 2 | | | | | | | | | | |
| 3 | | REGION CODE | | NET SALES | SALES PLAN *1,000 $ | | | | | |
| 4 | | | | *1,000 | | | | | | |
| 5 | | OVERALL RESULT | | | 5,910,245 | | | | | |
| 6 | | [+] ATLANTA | 610.00 | | 0.61 | | | | | |
| 7 | | [+] CENTRAL | 1,755,028,359.00 | 1,755,029.36 | | | | | | |
| 8 | | [+] CHICAGO | 1,530.00 | | 1.53 | | | | | |
| 9 | | [+] MONTREAL | 330.00 | | 0.33 | | | | | |
| 10 | | [+] NORTH EAST | 477,183,573.00 | 477,183.57 | | | | | | |
| 11 | | [+] SOUTH EAST | 2,903,598,389.00 | 2,903,598.39 | | | | | | |
| 12 | | [+] TORONTO | 1,260.00 | | 1.26 | | | | | |
| 13 | | [+] WEST | 797,445,899.00 | 797,445.90 | | | | | | |
| 14 | | [+] NOT ASSIGNED | 5,910,245,355.00 | | 5,910,245 | | | | | |
| 15 | | | | | | | | | | |
| 16 | | | | | | | CUSTOMER | OVERALL RESULT | [+] AUTO | [+] CHURCH | [+] HEAVY IND | [+] NOT ASSIGNED |
| 17 | | | | | | | | | AUTO | CHURCH | HEAVY IND |
| 18 | | | | | | | ST | 1,509,461,913 | 1,186,187 | 834,990 | 964,093 | 1,509,476,543 |
| 19 | | | | | | | | | | | |
| 20 | | PRODUCT GROUP | | BILLED QUANTITY | | | | | | |
| 21 | | | | ST | | | | | | |
| 22 | | OVERALL RESULT | | 1,509,461,801 | | | | | | |
| 23 | | [+] ACCESSORIES | | 820,857,004 | | | | | | |
| 24 | | [+] BAG&OUTDOOR | | 153,849,431 | | | | | | |
| 25 | | [+] OFFICE | | 534,755,366 | | | | | | |

*FIG. 2D*

| | A | B | C | D | E | F | G | H | I | J |
|---|---|---|---|---|---|---|---|---|---|---|
| 1 | | FILE | EDIT | VIEW | INSERT | | | | | |
| 2 | | | | | | | | | | |
| 3 | | | | | | | | | | |
| 4 | | REGION CODE | | NET SALES.PLAN | NET SALES | SALES PLAN | | | | |
| 5 | | | | | | *1000 $ | | | | |
| 6 | | OVERALL RESULT | | | | 5,910,245 | | | | |
| 7 | | [+] ATLANTA | | 610.00 | 0.61 | | | | | |
| 8 | | [-] CENTRAL | | 1,755,028,359.00 | 1,755,028.36 | | | | | |
| 9 | | | EDI | 355,032,054.00 | 355,032.05 | | | | | |
| 10 | | | FAX | 517,495,492.00 | 517,495.49 | | | | | |
| 11 | | | INTERNET | 328,178,401.00 | 328,178.40 | | | | | |
| 12 | | | OTHERS | 136,192,899.00 | 136,192.90 | | | | | |
| 13 | | | PHONE | 418,129,413.00 | 418,129.41 | | | | | |
| 14 | | [+] CHICAGO | | 1,530.00 | 1.53 | | | | | |
| 15 | | [+] MONTREAL | | 330.00 | 0.33 | | | | | |
| 16 | | [+] NORTH EAST | | 477,183,573.00 | 477,183.57 | | | | | |
| 17 | | [+] SOUTH EAST | | 2,903,588,389.00 | 2,903,588.39 | | | | | |
| 18 | | [+] TORONTO | | 1,260.00 | 1.26 | | | | | |
| 19 | | [+] WEST | | 797,445,899.00 | 797,445.90 | | | | | |
| 20 | | [+] NOT ASSIGNED | | | | | | | | |
| 21 | | | | 5,910,245,355.00 | 5,910,245 | | OVERALL RESULT | [+] AUTO | [+] CHURCH | [+] HEAVY IND | [+] NOT ASSIGNED |
| 22 | | PRODUCT GROUP | | ST | | | | AUTO | CHURCH | HEAVY IND | |
| 23 | | OVERALL RESULT | | 1,509,461,801 | | | 1,509,461,813 | 1,186,187 | 834,990 | 964,093 | 1,506,476,543 |
| 24 | | [+] ACCESSORIES | | 820,867,004 | | | | | | | |
| 25 | | [+] BAG&OUTDOOR | | 153,849,431 | | | | | | | |
| | | [+] OFFICE | | 534,755,366 | | | | | | | |

| | A | B | C | D | E | | | | | |
|---|---|---|---|---|---|---|---|---|---|---|
| | | FILE | EDIT | VIEW | INSERT | | | | | |
| 1 | | | | 221 | | | | | | |
| 2 | | 252 | 254 | 236 | 238 | | | | | |
| 3 | | REGION CODE | NET SALES PLAN | NET SALES | SALES PLAN | 222 | | | | |
| 4 | | OVERALL RESULT | * | *1,000 | *1,000 $ | 224 | | | | |
| 5 | | | | | 5,910,245 | 226 | | | | |
| 6 | | [+] ATLANTA | 610.00 | 0.61 | | 228 | | | | |
| 7 | | [-] CENTRAL | 1,755,028,359.00 | 1,755,028.36 | | 230 | | | | |
| 8 | | EDI | 355,032,054.00 | 355,032.05 | | | | | | |
| 9 | | FAX | 517,495,492.00 | 517,495.49 | | | | | | |
| 10 | | INTERNET | 329,178,401.00 | 329,178.40 | | | | | | |
| 11 | | OTHERS | 136,192,899.00 | 136,192.90 | | | | | | |
| 12 | | PHONE | 418,129,413.00 | 418,129.41 | | | | | | |
| 13 | | [+] CHICAGO | 1,530.00 | 1.5 | | 232 | | | | |
| 14 | | [+] MONTREAL | 330.00 | 0.33 | | 234 | | | | |
| 15 | | [+] NORTH EAST | 477,193,573.00 | 477,193.57 | 286 | | | | | |
| 16 | | [+] SOUTH EAST | 2,903,598,389.00 | | BILLED QUANTITY | ST | CUSTOMER | OVERALL RESULT | [+] AUTO | [+] CHURCH | [+] HEAVY IND [+] NOT ASSIGNED |
| 17 | | [+] TORONTO | 1,260.00 | | | 244 | | 1,509,461,813 | AUTO | CHURCH | HEAVY IND |
| 18 | | [+] WEST | 797,445,899.00 | | | | | 287 | 288 | 289 | 290 | 291 |
| 19 | | [+] NOT ASSIGNED | -5,910,245.00 | | | 5,910,245 | | | 1,180,187 | 834,990 | 984,093 | 1,508,476,543 |
| 20 | | | 272 | 261 | 274 | ST 264 | | | | | |
| 21 | | PRODUCT GROUP | OVERALL RESULT | 1,509,461,801.00 | 266 | | | | | | |
| 22 | | [+] ACCESSORIES | 820,867,004 | 267 | | | | | | | |
| 23 | | [+] BAG&OUTDOOR | 153,849,431 | 268 | | | | | | | |
| 24 | | [+] OFFICE | 534,755,386 | 269 | | | | | | | |
| 25 | | | | | | | | | | | |

299: BRING TO FRONT / BRING FORWARD / SEND TO BACK / SEND BACKWARD

| ITEM NO. | SPREADSHEET LOCATION | STACK POSITION |
|---|---|---|
| | | |

*FIG. 4A*

| ITEM NO. | SPREADSHEET LOCATION | STACK POSITION |
|---|---|---|
| 1 | B3:E19 | 1 |

*FIG. 4B*

| ITEM NO. | SPREADSHEET LOCATION | STACK POSITION |
|---|---|---|
| 1 | B3:E19 | 2 |
| 2 | C19:D24 | 1 |

| ITEM NO. | SPREADSHEET LOCATION | STACK POSITION |
|---|---|---|
| 1 | B3:E14 | 3 |
| 2 | C19:D24 | 2 |
| 3 | D16:J18 | 1 |

| ITEM NO. | SPREADSHEET LOCATION | STACK POSITION |
|---|---|---|
| 1 | B3:E19 | 3 |
| 2 | C19:D24 | 2 |
| 3 | D16:J18 | 1 |

| ITEM NO. | SPREADSHEET LOCATION | STACK POSITION |
|---|---|---|
| 1 | B3:E19 | 2 |
| 2 | C19:D24 | 3 |
| 3 | D16:J18 | 1 |

FIG. 6B

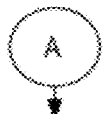

612 — RECEIVING A REQUEST TO CHANGE THE STACK POSITION ASSOCIATED WITH ONE OF THE PLURALITY OF ITEMS,

CHANGING THE STACK POSITION ASSOCIATED WITH THE ONE OF THE PLURALITY OF ITEMS AND THE RESPECTIVE STACK POSITION OF AT LEAST ONE OTHER ITEM OF THE PLURALTIY OF ITEMS BASED AT LEAST IN PART ON THE REQUEST TO CHANGE THE STACK POSITION ASSOCIATED WITH THE ONE OF THE PLURALITY OF ITEMS, AND

RE-RENDERING AT LEAST A PORTION OF THE ELCTRONIC SPREADSHEET IN ACCORDANCE WITH THE INFORMATION DEFINING THE PLURALITY OF ITEMS, THE RESPECTIVE LOCATION ASSOCIAED WITH EACH ITEM AND THE RESPECTIVE STACK POSITION ASSOCIATED WITH EACH ITEM

614 — RECEIVING A REQUEST TO CHANGE THE LOCATION ASSOCIATED WITH ONE OF THE PLURALITY OF ITEMS SUCH THAT THE LOCATION OF ONE OF THE PLURALITY OF ITEMS OVERLAPS THE LOCATION OF AT LEAST ONE OTHER ITEM OF THE PLURALITY OF ITEMS,

CHANGING THE LOCATION ASSOCIATED WITH THE ONE OF THE PLURALITY OF ITEMS SUCH THAT THE LOCATION OF ONE OF THE PLURALITY OF ITEMS OVERLAPS THE LOCATION OF AT LEAST ONE OTHER ITEM OF THE PLURALITY OF ITEMS,

DETERMINING A PORTION OF THE AT LEAST ONE OTHER ITEM OF THE PLURALITY OF ITEMS THAT IS OVERLAPPED BY THE ONE OF THE PLURALITY OF ITEMS,

AFTER THE CHANGING THE LOCATION ASSOCIATED WITH THE ONE OF THE PLURALITY OF ITEMS SUCH THAT THE LOCATION OF ONE OF THE PLURALITY OF ITEMS OVERLAPS THE LOCATION OF AT LEAST ONE OTHER ITEM OF THE PLURALITY OF ITEMS, RE-RENDERING AT LEAST A PORTION OF THE ELECTRONIC SPREADSHEET IN ACCORDANCE WITH THE INFORMATION DEFINING THE PLURALITY OF ITMES, THE RESPECTIVE LOCATION ASSOCIATED WITH EACH ITEM AND THE RESPECTIVE STACK POSITION ASSOCIATED WITH EACH ITEM; AND

AFTER THE RE-RENDERING AT LEAST A PORTION OF THE ELECTRONIC SPREADSHEET, RETAINING THE PORTION OF THE AT LEAST ONE OTHER ITEM OF THE PLURALITY OF ITEMS THAT IS OVERLAPPED BY THE ONE OF THE PLURALITY OF ITEMS

METHODS, APPARATUS, SYSTEMS AND COMPUTER READABLE MEDIUMS FOR USE IN ASSOCIATION WITH ELECTRONIC SPREADSHEETS

BACKGROUND

Electronic spreadsheets are often used in the retrieval, manipulation and/or display of data.

For example, electronic spreadsheets are often used to retrieve data from a database, to perform one or more computations using the data, and/or to display the data and/or the results of the computations. The database from which the data is retrieved is sometimes part of a processing system, such as for example an enterprise resource planning (ERP) system, or a business intelligence (BI) system, both provided by SAP AG headquartered in Walldorf, Germany.

More space is sometimes needed to display data in a portion of a spreadsheet. In some instances, a neighboring portion of the electronic spreadsheet may be overwritten to provide the needed space. In other instances, additional rows and/or columns may be added to the electronic spreadsheet in order to provide the needed space.

SUMMARY

Although there exists the ability to overwrite portions of an electronic spreadsheet and/or to add rows and/or columns of an electronic spreadsheet, it has been determined that other methods, apparatus, systems and computer readable mediums for use in association with electronic spreadsheets are desired.

To address this, in some aspects, items in an electronic spreadsheet are associated with positions in a stack and may overlap one or more portions of one another without resulting in complete overwriting (i.e., deletion) of such portions.

In one aspect, a method comprises providing an electronic spreadsheet having a plurality of cells arranged in an array having a plurality of rows and a plurality of columns; receiving information defining a plurality of items, each of the plurality of items representing a respective set of data usable in populating at least a portion of the plurality of cells of the electronic spreadsheet, at least one of the plurality of items including a table having a plurality of rows and a plurality of columns; associating each of the plurality of items with a respective location in the electronic spreadsheet; associating each of the plurality of items with a respective position in a stack, each of the plurality of items being able to be associated with any position in the stack; and rendering the electronic spreadsheet in accordance with the information defining the plurality of items, the respective location associated with each item and the respective stack position associated with each item.

In another aspect a computer readable storage medium having instructions stored thereon, the instructions being executable by a machine to result in a method comprising: providing an electronic spreadsheet having a plurality of cells arranged in an array having a plurality of rows and a plurality of columns; receiving information defining a plurality of items, each of the plurality of items representing a respective set of data usable in populating at least a portion of the plurality of cells of the electronic spreadsheet, at least one of the plurality of items including a table having a plurality of rows and a plurality of columns; associating each of the plurality of items with a respective location in the electronic spreadsheet; associating each of the plurality of items with a respective position in a stack, each of the plurality of items being able to be associated with any position in the stack; and rendering the electronic spreadsheet in accordance with the information defining the plurality of items, the respective location associated with each item and the respective stack position associated with each item.

In another aspect, an apparatus comprises: a processing system to provide an electronic spreadsheet having a plurality of cells arranged in an array having a plurality of rows and a plurality of columns, receive information defining a plurality of items, each of the plurality of items representing a respective set of data usable in populating at least a portion of the plurality of cells of the electronic spreadsheet, at least one of the plurality of items including a table having a plurality of rows and a plurality of columns; associate each of the plurality of items with a respective location in the electronic spreadsheet; associate each of the plurality of items with a respective position in a stack, each of the plurality of items being able to be associated with any position in the stack; and render the electronic spreadsheet in accordance with the information defining the plurality of items, the respective location associated with each item and the respective stack position associated with each item.

In another aspect, a method comprises: providing an electronic spreadsheet having a plurality of cells arranged in an array having a plurality of rows and a plurality of columns; receiving information defining an item, the item including a table having a plurality of rows and a plurality of columns, the item further including a graphical tool activatable by a user to indicate a request to expand the item; associating the item with a location in the electronic spreadsheet; rendering the electronic spreadsheet in accordance with the information defining the item and the location associated with the item; after the rendering of the electronic spreadsheet in accordance with the information defining the item and the location associated with the item, receiving an indication that a user has activated the graphical tool included in the item; and expanding the item in response to the indication that the user has activated the graphical tool included in the item.

This summary is not intended to be exhaustive and/or limiting. For example, while some aspects are described in this summary, other aspects may not be described in this summary but rather may be apparent from the description, drawings and/or claims which follow. Moreover, some aspects may not include one or more portions of the aspects described in this summary and/or may not provide one or more of any possible needs, desires and/or advantages mentioned in this summary.

BRIEF DESCRIPTION OF THE DRAWINGS

FIGS. 2A-2F are representations of views in a user interface that illustrate a method, in accordance with some embodiments.

FIGS. 4A-4F are representations of different states of a table, in accordance with some embodiments.

FIGS. 6A-6B are a flow chart of a method, in accordance with some embodiments.

DETAILED DESCRIPTION

Figure 1:
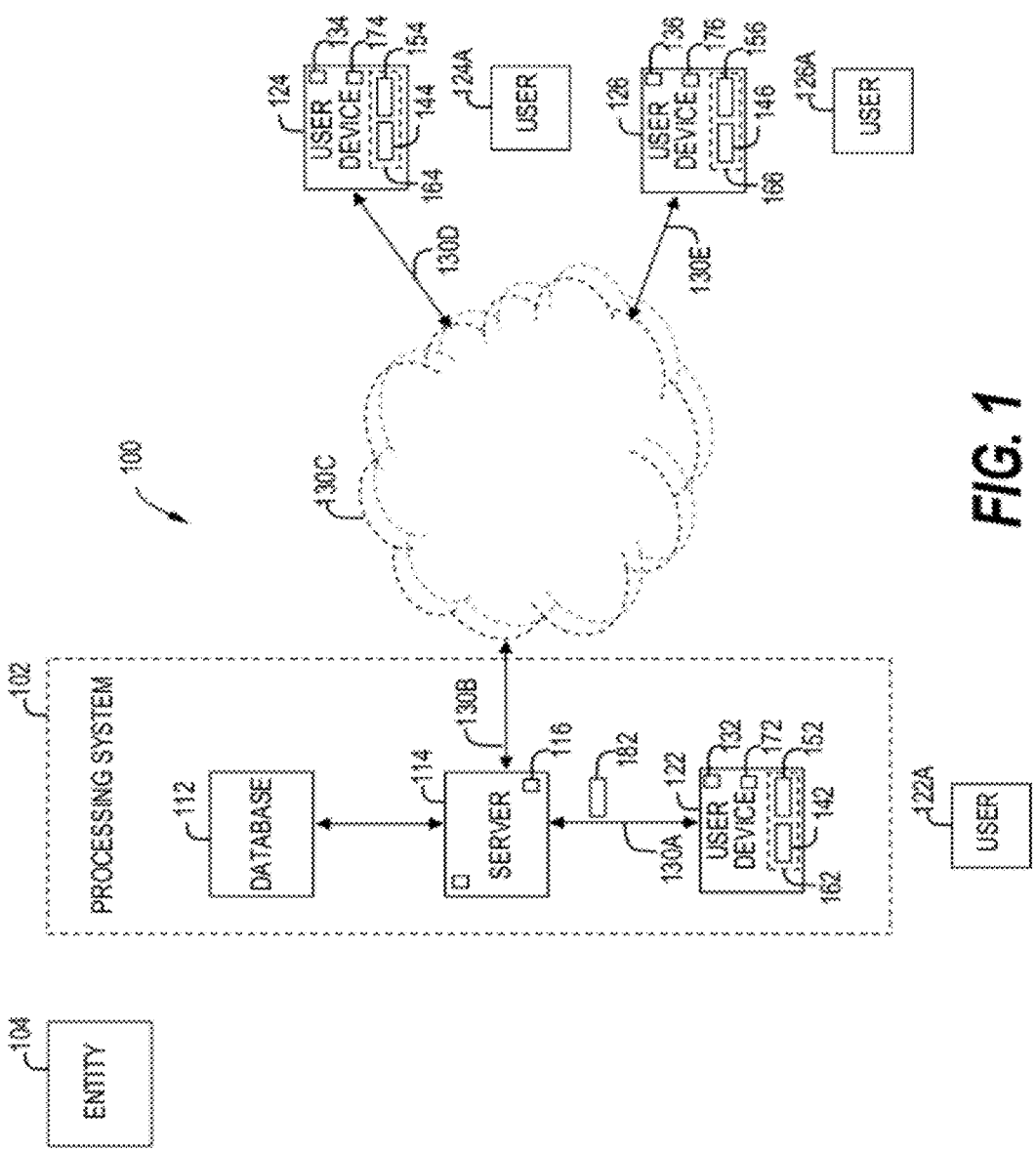
FIG. 1 is a block diagram of a system 100 in accordance with some embodiments.

FIG. 1 is a block diagram of a system 100 in accordance with some embodiments. Referring to FIG. 1, the system 100 includes a processing system 102 operated by, and/or on behalf of, an entity 104, e.g., a business.

The processing system 102, which may be an enterprise resource planning (ERP) system, such as, for example an ERP system provided by SAP® AG headquartered in Walldorf, Germany, may include a database 112 and a server 114. The database 112 may store information collected and/or used by the entity 104. The server 114 may be coupled to the database 112 and may communicate therewith.

The server 114, which may be coupled to and/or in communication with the database 112, may include one or more processors, e.g., processor 116. The one or more processors may perform one or more functions. One or more of the processors may execute one or more programs to perform one or more of such functions.

The system 100 may further include a plurality of user devices, e.g., user devices 122-126. The user devices, which may be operated by a plurality of users, e.g., 122A-126A, may be coupled to the server 114 via one or more communication links, e.g., communication links 130A-130E. One or more of the user devices, e.g., user devices 124-126, may be located remote from the processing system 102. One or more of the user devices, e.g., user device 122, may comprise a desktop computer. One or more others of the user devices, e.g., user device 124 and/or user device 126, may comprise a laptop computer, a portable data assistant, a smart phone, and/or other type of user device.

Each of the user devices 122-126 may include a processing system that includes one or more processors, e.g., processors 132-136, respectively, one or more input devices, e.g., input devices 142-146, respectively, and one or more output devices, e.g., display devices 152-156, respectively. That is, the user device 122 may include a processing system that includes one or more processors, e.g., processor 132, one or more input devices, e.g., input device 142, and one or more output devices, e.g., display device 152. The user device 124 may include a processing system that includes one or more processors, e.g., processor 134, one or more input devices, e.g., input device 144, and one or more output devices, e.g., display device 154. And so on. The one or more processors, e.g., processors 132-136, may communicate with the input devices 142-146, respectively, and/or with the display devices 152-156, respectively, to provide user interfaces 162-166, respectively.

In some embodiments, the one or more processors, e.g., processors 132-136, execute one or more programs to perform one or more functions. One of such programs may be an electronic spreadsheet application program, which may be executed by a processor of a user device and used in the retrieval, manipulation and/or display of data. For example, the user devices 122-126 may include electronic spreadsheet application programs, e.g., 172-176, respectively, which may be executed by the processors 132-136 of user devices 122-126, respectively, and used in the retrieval, manipulation and/or display of data.

In some embodiments, an electronic spreadsheet application program comprises a Microsoft® Excel® and/or an IBM® Lotus 1-2-3® spreadsheet application program. In some embodiments, an electronic spreadsheet application program comprises a Microsoft® Excel® and/or an IBM® Lotus 1-2-3® spreadsheet application program in combination with a spreadsheet add-in that includes one or more portions of one or more embodiments disclosed herein. As used herein, a spreadsheet "add-in" may refer to, for example, a plug-in component or module that executes in association with a spreadsheet application to provide additional functionality for a user.

One or more portions of the data retrieved, manipulated and/or displayed using one or more of the electronic spreadsheet application programs may be stored in the database 112. One or more of the user devices, e.g., user devices 122-126, may communicate with the database 112, directly and/or indirectly, to request such data from the database 112. For example, data 182 may be stored in the database and the user device 122 may communicate with the database 112, directly and/or indirectly, to request the data 182 from the database 112. In some embodiments, one or more of the user devices 122-126 communicates with the server 114 to request the data from the database 112.

FIGS. 2A-2F are representations of views in a user interface that illustrate a method for use in association with an electronic spreadsheet application program, in accordance with some embodiments.

As further described below, in some embodiments, items in an electronic spreadsheet are associated with positions in a stack and may overlap one or more portions of one another without resulting in complete overwriting (i.e., deletion) of such portions.

In some embodiments, one or more of the views and/or one or more portions of the method may be provided in association with an electronic spreadsheet application program executed by a processor within one or more user devices, e.g., one or more of the user devices 122-126.

The method (or portion(s) thereof) may be performed using hardware, software (which may include low level language code and/or high language code) and/or any combination thereof. For that matter, any of the methods (or portion(s) thereof) described herein may be performed using hardware, software (which may include low level language code and/or high language code) or any combination thereof. In some embodiments, a storage medium may store thereon instructions that when executed by a machine result in performance of one or more portions of the method.

Notably, the views and the method disclosed herein are not limited to the views and method represented in FIGS. 2A-2F. Rather, other embodiments may use any views and method that is practicable.

Figure 2A:
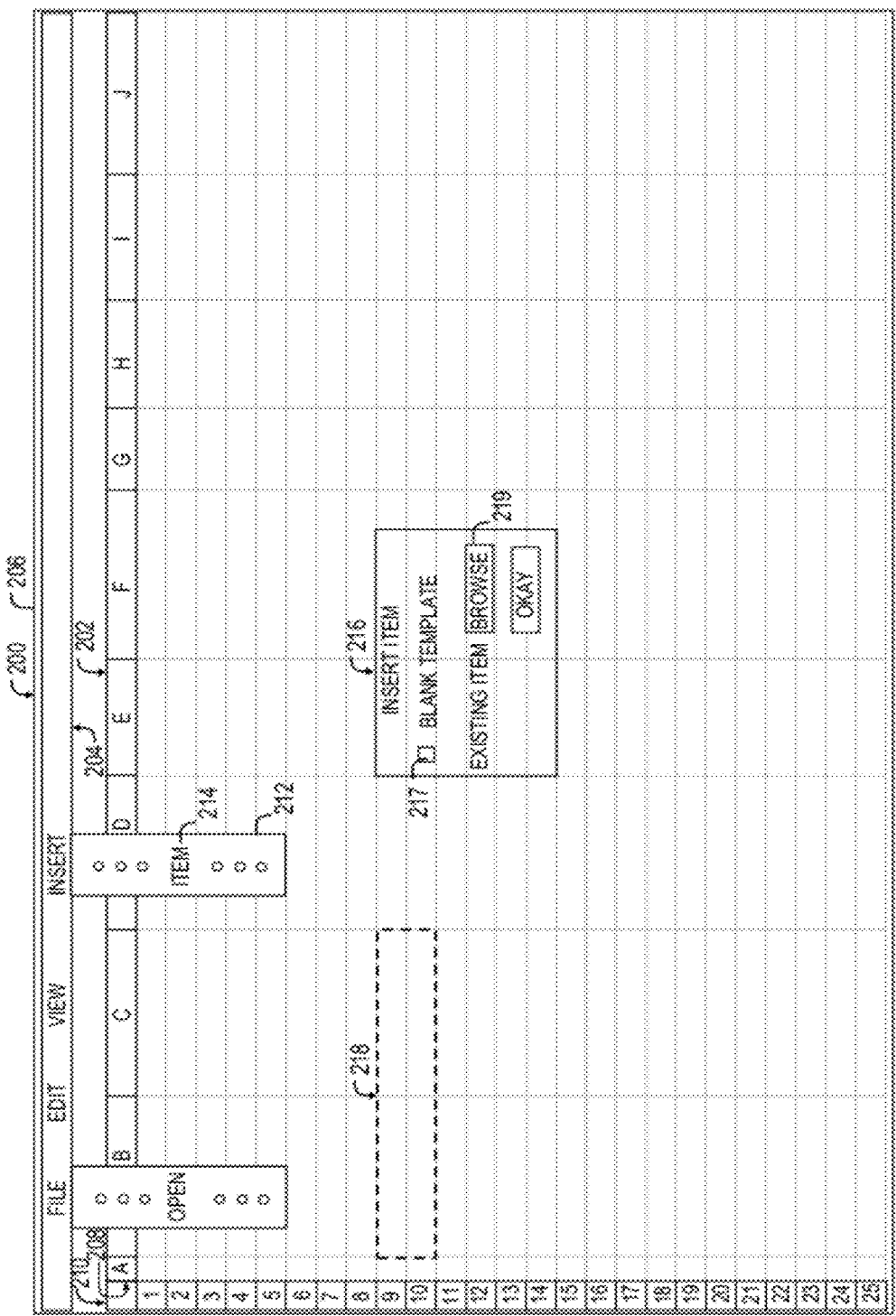

Referring to FIG. 2A, a view 200 in a user interface for an electronic spreadsheet application program includes an electronic spreadsheet 202 and a toolbar 204 surrounded by a border 206.

The electronic spreadsheet 202 includes a plurality of cells arranged in an array having a plurality of rows, e.g., represented by rows 1-25, and a plurality of columns, e.g., represented by columns "A"-"J". The electronic spreadsheet 202 further includes a top border 208, which includes identifiers for the plurality of columns, e.g., A-J, and a side border 210, which includes identifiers for the plurality of rows, e.g., 1-25. In some embodiments, each of the plurality of cells in the spreadsheet 202 may be empty, or alternatively, it may contain a numerical value, a formula or one or more alphanumeric characters. A given cell may be referred to herein by the column and the row in which the given cell is located. Thus, the cell in column A and row 1 may be referred to herein as cell A1, the cell in column A and row 2 may be referred to herein as cell A2, the cell in column A and row 3 may be referred to herein as cell A3, and so on.

The toolbar 204 may include a plurality of graphical tools, e.g., buttons represented by the words "FILE", "EDIT", VIEW", and "INSERT", each of which may be activated by a user to access a respective drop down menu associated therewith. For example, the "INSERT" button may be activated to access a pull down menu 212 associated with the "INSERT" button. In some embodiments, the pull down menu 212 may include a plurality of graphical tools, e.g., which may include a button 214 represented by the word "ITEM". The button represented by the word "ITEM" and/or some other type of graphical tool in the view 200 may be activated to access a graphical tool, e.g., a dialogue box, that may be used to add an item to the electronic spreadsheet 202. The dialogue box 216 or other graphical tool to add an item may include a graphical tool 217, e.g., a check box, to indicate that the item should be a blank item or template (e.g., blank item or template 218) and/or a graphical tool, e.g., a button 219, to indicate that the item is an existing item and to request an opportunity to browse for the existing item. In some embodiments, one or more items may be added by opening a document that defines one or more items, e.g., by activating the "FILE" button and an "OPEN" button in a drop down menu associated therewith.

The view 200 may further include one or more other graphical tools (not shown).

The border 206 defines a top edge, a bottom edge and side edges of the view 200.

Referring to FIG. 2B, in a view 220, a first item 221 has been added to the electronic spreadsheet 202. The first item 221 represents a set of data that is usable in populating a plurality of the cells (e.g., inserting a numerical value, a formula or one or more alphanumeric characters into each of the plurality of cells) in the electronic spreadsheet 202. In some embodiments, the first item represents a set of multidimensional data that is stored in, and/or retrieved from, one or more databases, e.g., database 112 of processing system 102. In some embodiments, data may be retrieved from the one or more databases by querying the one or more databases.

The first item 221 may have any form.

In the illustrated embodiment, the first item 221 includes a table having a plurality of rows 222-244 and a plurality of columns 252-258. The first two rows 222-224 of the table are header rows that include a plurality of identifiers (e.g., "REGION CODE", "NET SALES-PLAN", "NET SALES" and "SALES"), each of which is associated with a respective one of the plurality of columns 252-258 and indicates the type of information that is listed in the respective one of the plurality of columns 252-258. For example, the identifier "REGION CODE" is associated with a first column 252 and indicates that region code dimension members (e.g., "ATLANTA", "CENTRAL", "CHICAGO", "MONTREAL", "NORTH EAST", "SOUTHEAST", "TORONTO", "WEST" AND "NOT ASSIGNED") are listed in the first column 252. A dimension member "OVERALL RESULT" represents an aggregate of the other region code dimension members. The "OVERALL RESULT" dimension member is shown in the third row 256, which is above the other region code dimension members. However, in some embodiments, the "OVERALL RESULT" dimension member is in a row that is below, rather than above, the other region code dimension members. The identifier "NET SALES" is associated with a third column 256 and indicates that net sales measures are listed in the third column 256. The identifier "SALES PLAN" is associated with a fourth column 258 and indicates that sales plan measures are listed in the fourth column 258. The identifier "NET SALES-PLAN" is associated with a second column 254 and indicates that the second column 254 lists differences that are computed based on two measures, i.e., a net sales measure and a sales plan measure.

The third row 226 indicates an overall result for a sales plan measure.

Each of the other rows, i.e., rows 228-242, defines a line entry that is associated with a respective one of the region code dimension members listed in the first column 252. For example, row 228 is a line entry that is associated with the dimension member "ATLANTA". It includes a net sales measure (0.61*1000) for the dimension member "ATLANTA", a sales plan measure (none) for the dimension member "ATLANTA", and difference (610.00) between the net sales measure for the dimension member "ATLANTA" and the sales plan measure for the dimension member "ATLANTA. And so on.

A symbol, e.g., "+", adjacent to a dimension member in the first column 252 indicates that the table can be expanded to show additional dimension members associated with that dimension member. A graphical tool, e.g., a button represented by the "+" symbol adjacent to the dimension member in the first column 252, may be activated to request that such additional dimension members be added to the table. In some embodiments, the additional dimension members associated with the dimension member are hierarchically arranged with respect to the dimension member. For example, these additional dimension members may be decedents of the dimension member. In some embodiments, the request to add additional dimension members may result in additional rows (in the table) that include the additional dimension members. In some embodiments, the additional rows are directly below the row that includes the dimension member associated with the additional dimension members, e.g., as illustrated in FIG. 2E.

Figure 2C:
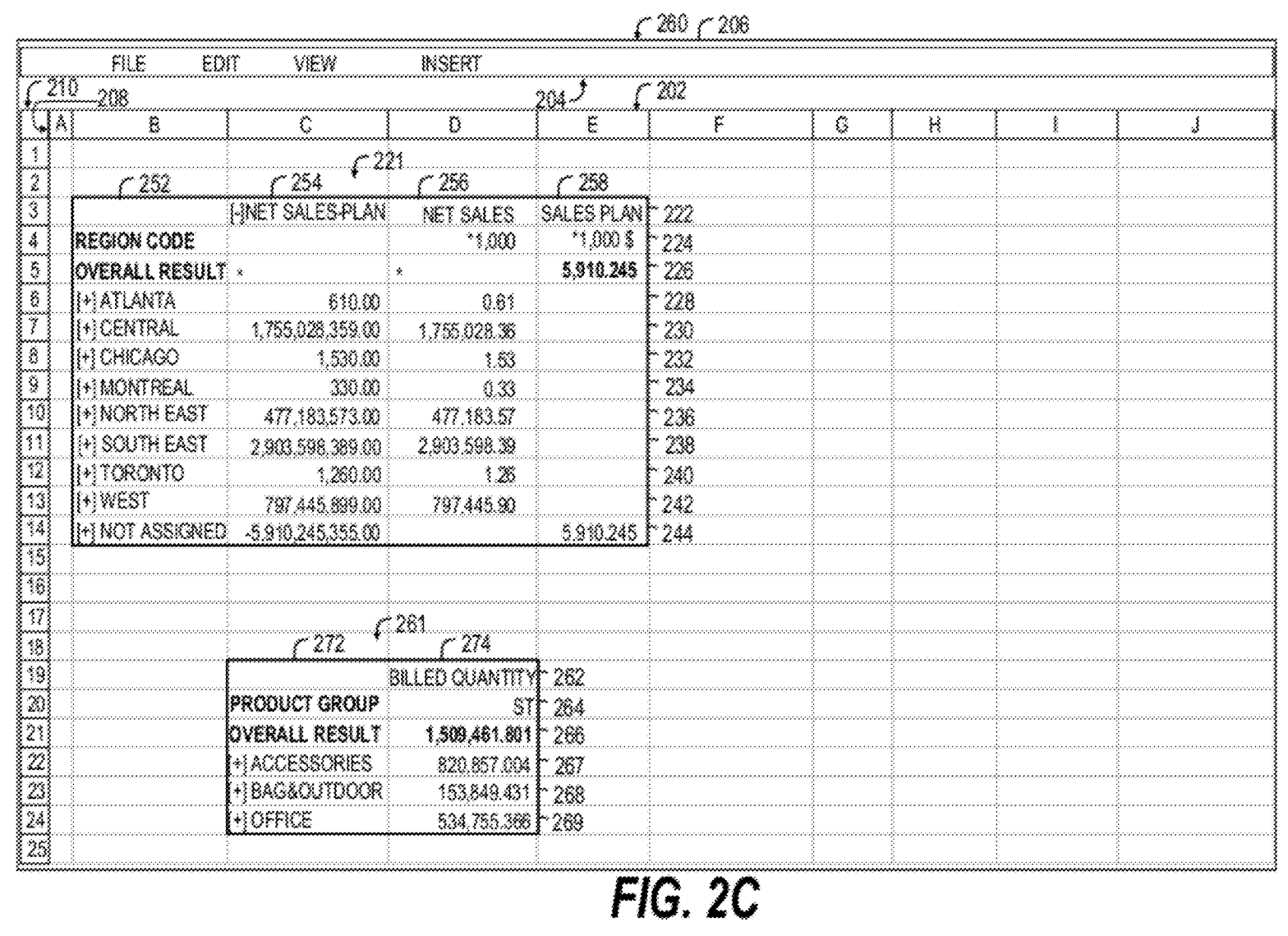

Referring to FIG. 2C, in a view 260, a second item 261 has been added to the electronic spreadsheet 202. As with the first item 221, the second item 261 represents a set of data that is usable in populating a plurality of the cells in the electronic spreadsheet 202. In some embodiments, the second item 261 represents a set of multidimensional data that is stored in, and/or retrieved from, one or more databases, e.g., database 112 of processing system 102.

The second item 261 may have any form.

In the illustrated embodiment, the second item 261 includes a table having a plurality of rows 262-269 and a plurality of columns 272-274. The first two rows 262-264 of the table are header rows that include a plurality of identifiers (e.g., "PRODUCT GROUP" and "BILLED QUANTITY"), each of which is associated with a respective one of the plurality of columns 272-274 and indicates the type of information that is listed in the respective one of the plurality of columns 272-274. For example, the identifier "PRODUCT GROUP" is associated with a first column 272 and indicates that product group dimension members (e.g., "ACCESSORIES", "BAG&OUTDOOR" and "OFFICE") are listed in the first column 272. The identifier "BILLED QUANTITY" is associated with a second column 274 and indicates that billed quantity measures are listed in the second column 274.

The third row 266 indicates an overall result for a billed quantity measure.

Each of the other rows, i.e., rows 267-269, defines a line entry that is associated with a respective one of the product group dimension members listed in the first column 272. For example, row 267 is a line entry that is associated with the dimension member "ACCESSORIES". It includes a billed quantity measure (820,857.004) for the dimension member "ACCESSORIES". And so on.

A symbol, e.g., "+", adjacent to a dimension member in the first column 272 indicates that the table can be expanded to show additional dimension members associated with that dimension member. A graphical tool, e.g., a button represented by the "+" symbol adjacent to the dimension member in the first column 272, may be activated to request that such additional dimension members be added to the table.

Referring to FIG. 2D, in a view 280, a third item 281 has been added to the electronic spreadsheet 202. As with the first item 221 and the second item 261, the third item 281 represents a set of data that is usable in populating a plurality of the cells in the electronic spreadsheet 202. In some embodiments, the third item 281 represents a set of multidimensional data that is stored in, and/or retrieved from, one or more databases, e.g., database 112 of processing system 102.

The third item 281 may have any form.

In the illustrated embodiment, the third item 281 includes a table having a plurality of rows 282-284 and a plurality of columns 285-291. The first two columns 285-286 of the table include a plurality of identifiers (e.g., "CUSTOMER" and "BILLED QUANTITY"), each of which is associated with a respective one of the plurality of rows 282, 284 and indicates the type of information that is listed in the respective one of the plurality of rows. For example, the identifier "CUSTOMER" is associated with a first row 282 and indicates that customer dimension members (e.g., "AUTO", "CHURCH", "HEAVY IND" and "NOT ASSIGNED") are listed in the first row 282. The identifier "BILLED QUANTITY" is associated with the row 284 and indicates that billed quantity measures are listed in the third row 284.

The third column 287 indicates an overall result for a billed quantity measure.

Each of the other columns, i.e., columns 288-291, defines a line entry that is associated with a respective one of the customer dimension members listed in the first row 282. For example, column 288 is a line entry that is associated with the dimension member "AUTO". It includes a billed quantity measure (1,186.187) for the dimension member "AUTO". And so on.

A symbol, e.g., "+", adjacent to a dimension member in the first row 282 indicates that the table can be expanded to show additional dimension members associated with that dimension member. A graphical tool, e.g., a button represented by the "+" symbol adjacent to the dimension member in the first row 282, may be activated to request that such additional dimension members be added to the table. In some embodiments, the request to add additional dimension members may result in additional columns (in the table) that include the additional dimension members. In some embodiments, the additional columns are directly to the side of the column that includes the dimension member associated with the additional dimension members.

Each item is associated with a respective location in the electronic spreadsheet. In the illustrated embodiment, the first item 221 is associated with a first location in the electronic spreadsheet, e.g., cell B3 to cell E14 (sometimes indicated as B3:E14). The second item 261 is associated with a second location in the electronic spreadsheet, e.g., cell C19 to cell D24 (sometimes indicated as C19:D24). The third item 281 is associated with a third location in the electronic spreadsheet, e.g., cell D16 to cell J18 (sometimes indicated as D16:J18).

Each item is also associated with a respective position (or priority) in a stack. In the illustrated embodiment, a default convention is to associate the first item 221 with a maximum position (or priority) in the stack, to associate the second item 261 with a next highest position (or priority) in the stack and to associate the third item 281 with a next highest position (or priority) in the stack. However, other default conventions may also be used.

In some embodiments, the stack position represents a priority in a view. A highest priority in the stack may be treated as being in front of all other priorities in the stack. A second highest priority in the stack may be treated as being behind the highest priority in the stack but in front of all priorities other than the highest priority in the stack. And so on.

In the illustrated embodiment, none of the items 221, 261, 281 overlaps (i.e., located at a position that corresponds with the position of) another item, in whole or in part. In such embodiment, each item may be used in populating the plurality of cells of the electronic spreadsheet that are overlapped by (i.e., located at positions that correspond with the position of) such item. Thus, the first item 221 is used in populating cells B3:E14. For example, the first column is used in populating cells B3:B14 (where a first entry in the first column is used in populating cell B3, the second entry in the first column is used in populating cell B4, the third entry in the first column is used in populating cell B5, and so on), the second column is used in populating cells C3:C14, the third column is used in populating cells D3:D14, and so on. The second item 261 is used in populating cells C19:D24. The third item 281 is used in populating cells D16:J18.

However, as further described below, in some embodiments, one or more of the items may be moved and or expanded, and as a result, the location of such item may overlap the location of one or more of the other items.

As further described below, in some embodiments, the stack positions (or priorities) may be used to determine which items will be used to populate certain cells of the electronic spreadsheet in the event that the location of one or more of the items in the electronic spreadsheet overlaps the location of one or more other items in the electronic spreadsheet.

It should be understood that a stack may be explicitly implemented, e.g., as described herein, and/or implicit implemented.

It should also be understood that in some embodiments, the items need not overlap one another, in whole or in part.

Referring to FIG. 2E, in a view 292, a first item 221 has been expanded, e.g., by activating a graphical tool (e.g., the button represented by the "+" symbol adjacent to the dimension member "CENTRAL" in the first column 252). The first column 252 now also includes second dimension members (e.g., distribution channel dimension members "EDI", "FAX", INTERNET", "OTHERS" and "PHONE") that are associated with the first dimension member "CENTRAL". Moreover, table now includes additional rows 293-297, each of which defines a line entry that is associated with a respective one of the second dimension members (e.g., distribution channel dimension members "EDI", "FAX", INTERNET", "OTHERS" and "PHONE") that are associated with the first dimension member "CENTRAL". For example, row 293 is a line entry that is associated with the second dimension member "EDI". It includes a net sales measure for the second dimension member "EDI", a sales plan measure (none) for the dimension member "EDI", and difference between the net sales measure for the dimension member "EDI" and the sales plan measure for the dimension member "EDI. And so on.

Notably, the first item 221 is now associated with a spreadsheet location of B3:E19 which overlaps the spreadsheet location of the second item 261 and the spreadsheet location of the third item 281.

The electronic spreadsheet 202, or at least a portion thereof, is rendered in accordance with the information defining the plurality of items, the respective location associated with each item and the respective stack position associated with each item.

Because the first item 221 has the highest stack position (or priority), the data of the first item 221 is used to populate each of the plurality of cells of the electronic spreadsheet that are overlapped by (i.e., located at positions that correspond with the position of) the first item 221.

As a result, a portion of the second item 261 and a portion of the third item 281 are no longer visible in the view 292.

However, such portion of the second item 261 and such portion of the third item 281 may be retained by the electronic spreadsheet application program and may remain available to populate cells of the electronic spreadsheet in the event that the relative stack positions (or priority) of the first item 221, the second item 261 and/or the third item 281 are changed (and/or in the event that the relative locations of the first item 221, the second item 261 and/or the third item 281 are changed).

Referring to FIG. 2F, in a view 298, a stack position of the third item 281 has been changed, such that the third item 281 now has the maximum stack position (or priority) and the stack positions of the first item and the second item 281 have been adjusted accordingly.

Because the third item 281 now has the maximum stack position (or priority), the data of the third item 281 is used to populate each of the cells overlapped by (i.e., located at positions that correspond with the position of) the third item 281.

As a result, a portion of the first item 221 and a portion of the second item 261 are no longer visible in the view 298.

However, such portion of the first item 221 and such portion of the second item 261 may be retained by the electronic spreadsheet application program and may remain available to populate cells of the electronic spreadsheet in the event that the relative stack positions (or priority) of the first item 221, the second item 261 and/or the third item 281 are changed (and/or in the event that the relative locations of the first item 221, the second item 261 and/or the third item 281 are changed).

In the illustrated embodiment, a graphical tool, e.g., a button represented by the words "BRING TO FRONT", in a menu 299, may be activated to request that the stack position of the third item 281 (or any other item) be set equal to the maximum stack position (or priority).

In some embodiments, a menu 299 for changing a stack position of the third item 281 (or other item for which the respective stack position is to be changed) is accessed by positioning a mouse cursor 299A onto the third item 281 (or other item for which the respective stack position is to be changed) and by pressing a right mouse button while maintaining such positioning of the mouse cursor.

In the illustrated embodiment, the menu 299 may also be used to request other changes to the stack position of the third item 281 (or any other item)

For example, a button represented by the words "SEND TO BACK", may be activated to request that the stack position of the third item 281 (or any other item) be set equal to the minimum stack position (or priority). A button represented by the words "BRING FORWARD", may be activated to request that the stack position (or priority) of the third item 281 (or any other item) be incremented by 1. A button represented by the words "SEND BACKWARD", may be activated to request that the stack position (or priority) of the third item 281 (or any other item) be decremented by 1.

In some embodiments, changing the stack position of the first item 221, such that the first item 221 again has the maximum stack position (or priority) and adjusting the stack positions of the second item 261 and the third item 281 accordingly, may result in the view 292 of FIG. 2E.

Contracting the first item 221, e.g., by activating a graphical tool (e.g., the button represented by the "–" symbol adjacent to the dimension member "CENTRAL" in the first column 252), may result in the view 280 of FIG. 2D.

Although the first item 221, the second item 261 and the third item 281 may include a table having a plurality of rows and a plurality of columns, as in the illustrated embodiment, this does not preclude one or more of the items having a form that does not include a table, for example, a form that includes a chart rather than a table.

As stated above, the first item 221, the second item 261 and the third item 281 may have any form. Thus, while each may include a table having a plurality of rows and a plurality of columns, as in the illustrated embodiment, this is not required. In some embodiments, one or more of the items may not include a table. In some embodiments, one or more of the items may include a chart (and/or something else) rather than a table.

Although the illustrated embodiment includes three items 221, 261, 281, some embodiments are not limited to three items. In some embodiments, the number of items may be less than three. In some embodiments, the number of items may be greater than three. In some embodiments, the number of items is any number of items desired by a user.

Figure 3A:
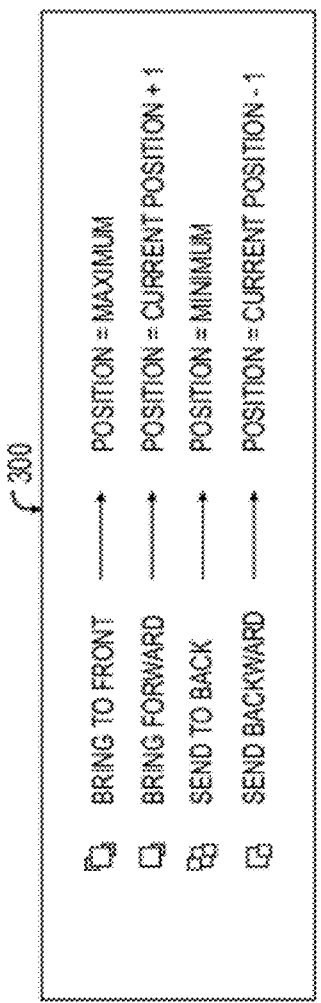
FIG. 3A is a representation of changes that may be requested and actions that may be taken in response thereto, in accordance with some embodiments.

FIG. 3A is a representation 300 of changes that may be requested to a stack position (or priority) and actions that may be taken in response to the requested changes, in accordance with some embodiments.

Figure 3B:
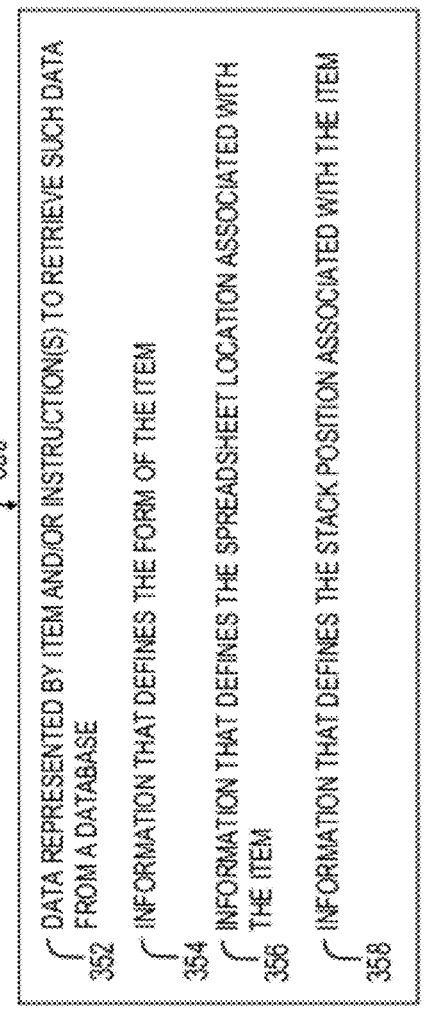
FIG. 3B is a representation of information that may be stored for each item, in accordance with some embodiments.

FIG. 3B is a representation 350 of information that may be stored for each of the plurality of items, in accordance with some embodiments.

Referring to FIG. 3B, in accordance with some embodiments, the information may include four portions 352-358. A first portion 352 may comprise the data that is represented by the item and/or instructions for retrieving such data from a database. In some embodiments, the instructions comprise a query that may be used to retrieve the data from a database. In some embodiments, a user provides the instructions using a graphical tool, e.g., a pull down menu in a view in a graphical user interface. In some embodiments, a user provides the instructions by typing the instructions in one of the plurality of cells of the spreadsheet.

A second portion 354 may comprise information that defines the form of the item. In some embodiments, this comprises information that defines an arrangement of dimensions and/or measures within an item. In some embodiments, the form of the item is independent of the spreadsheet location associated with the item.

A third portion 356 may comprise information that defines the spreadsheet location that is associated with the item.

A fourth portion 358 may comprise information that defines the stack position (or priority) that is associated with the item.

FIGS. 4A-4F are representations of different states of a table 400 that may store the spreadsheet location and/or the stack position associated with each of the plurality of items in FIGS. 2A-2F, respectively, in accordance with some embodiments.

Referring to FIG. 4A, in an initial state, the table 400 may indicate that there are no items in FIG. 2A.

Referring to FIG. 4B, after the first item 221 is added in FIG. 2B, the table 400 may indicate that the first item is associated with a spreadsheet location of B3:E14 and a stack position of 1.

Referring to FIG. 4C, after the second item 261 is added in FIG. 2C, the table 400 may indicate that the first item is associated with a spreadsheet location of B3:E14 and a stack position of 2 and that the second item 261 is associated with a spreadsheet location of C19:D24 and a stack position of 1.

Referring to FIG. 4D, after the third item 281 is added in FIG. 2D, the table 400 may indicate that the first item 221 is associated with a spreadsheet location of B3:E14 and a stack position of 3, the second item 261 is associated with a spreadsheet location of C19:D24 and a stack position of 2, and the third item 281 is associated with a spreadsheet location of D16:J18 and a stack position of 1.

Referring to FIG. 4E, after the first item is expanded in FIG. 2E, the table 400 may indicate that the first item is associated with a spreadsheet location of B3:E19 and a stack position of 3, the second item 261 is associated with a spreadsheet location of C19:D24 and a stack position of 2, and the third item 281 is associated with a spreadsheet location of D16:J18 and a stack position of 1.

Referring to FIG. 4F, after the change to the stack positions in FIG. 2F, the table 400 may indicate that the first item 221 is associated with a spreadsheet location of B3:E19 and a stack position of 2, the second item 261 is associated with a spreadsheet location of C19:D24 and a stack position of 3, and the third item 281 is associated with a spreadsheet location of D16:J18 and a stack position of 1.

Figure 5A:
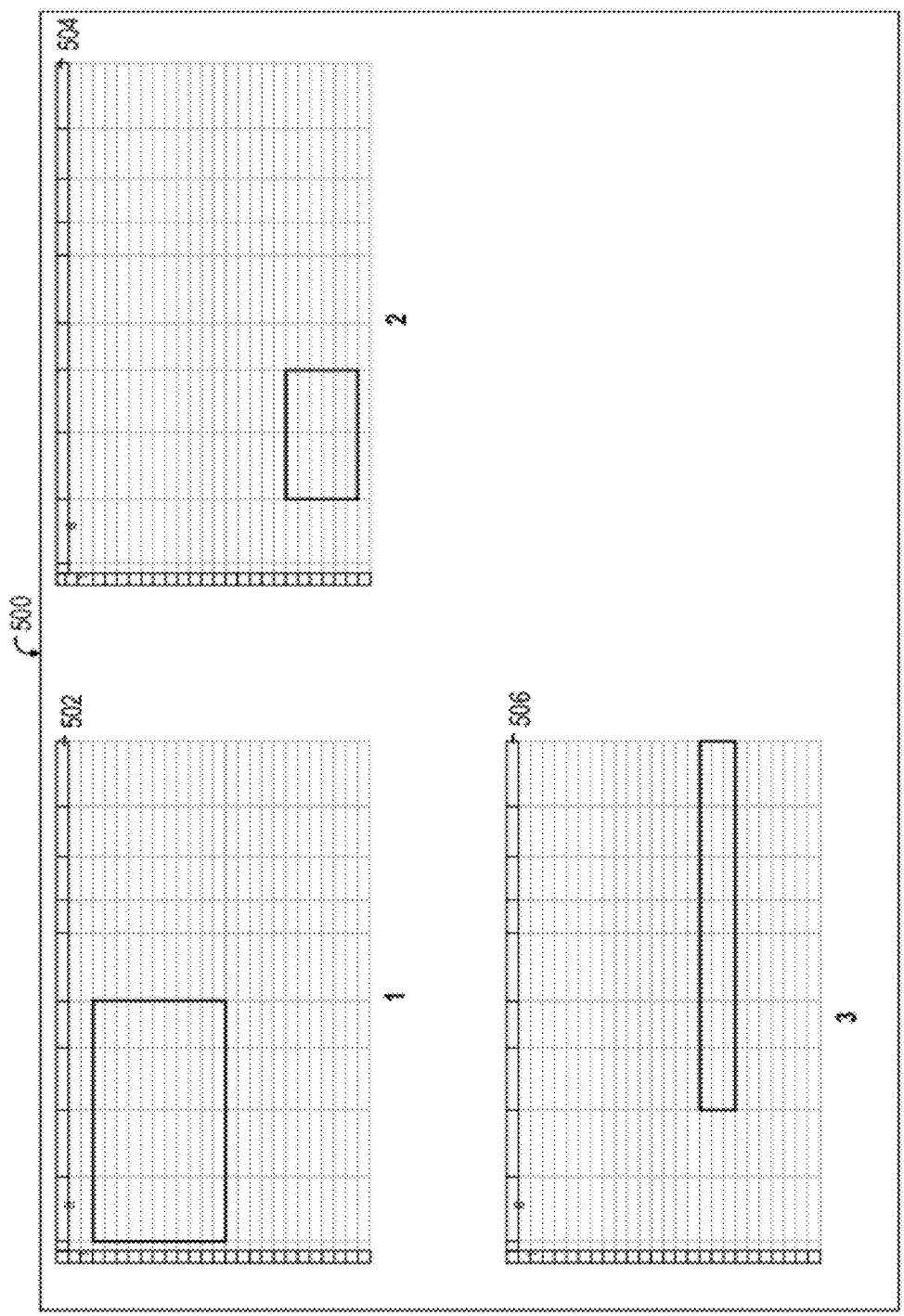
FIGS. 5A-5C are representations of a graphical tool that may be used to request changes to stack positions associated with items in an electronic spreadsheet, in accordance with some embodiments.
Figure 5B:
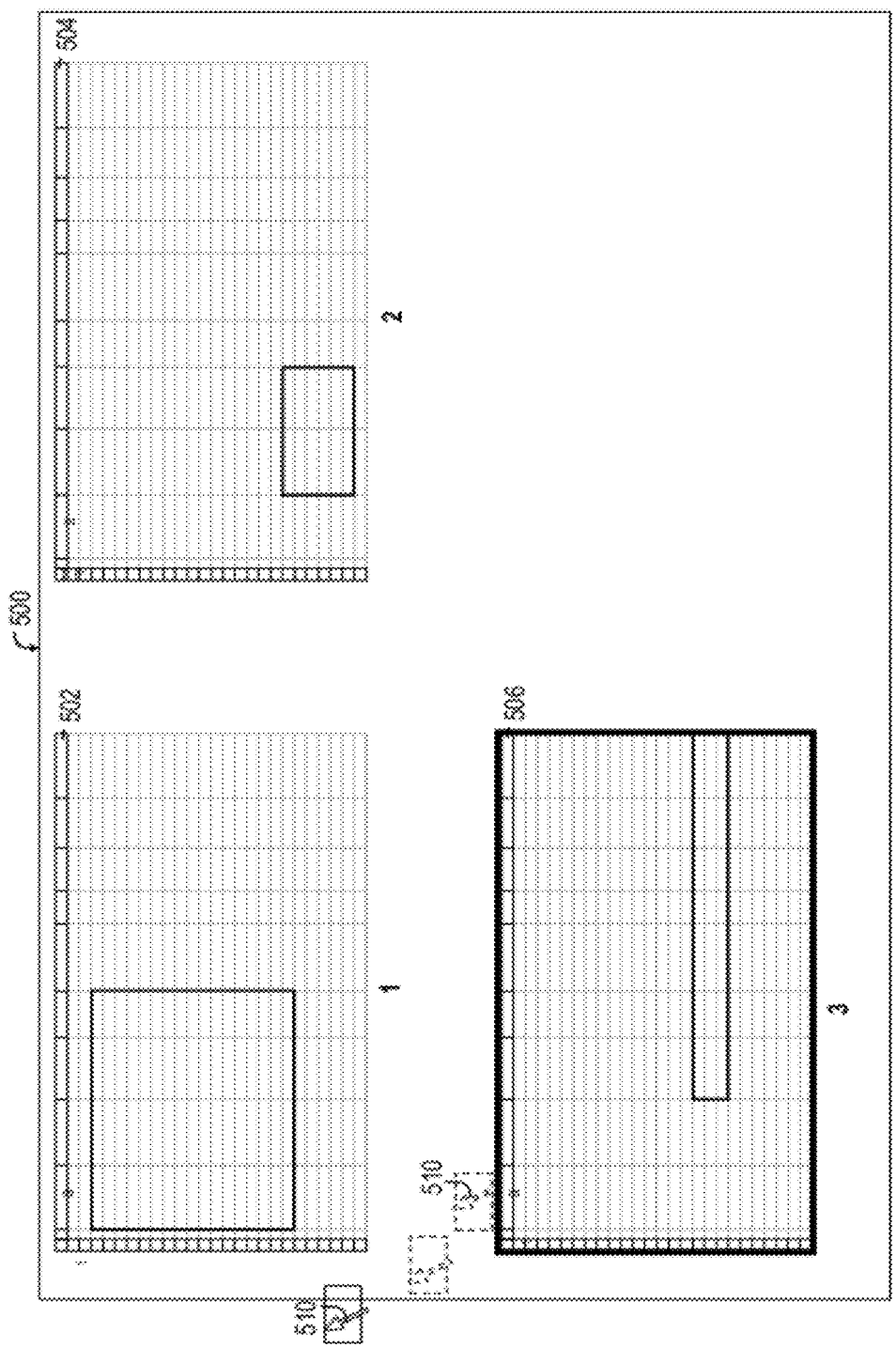
Figure 5C:
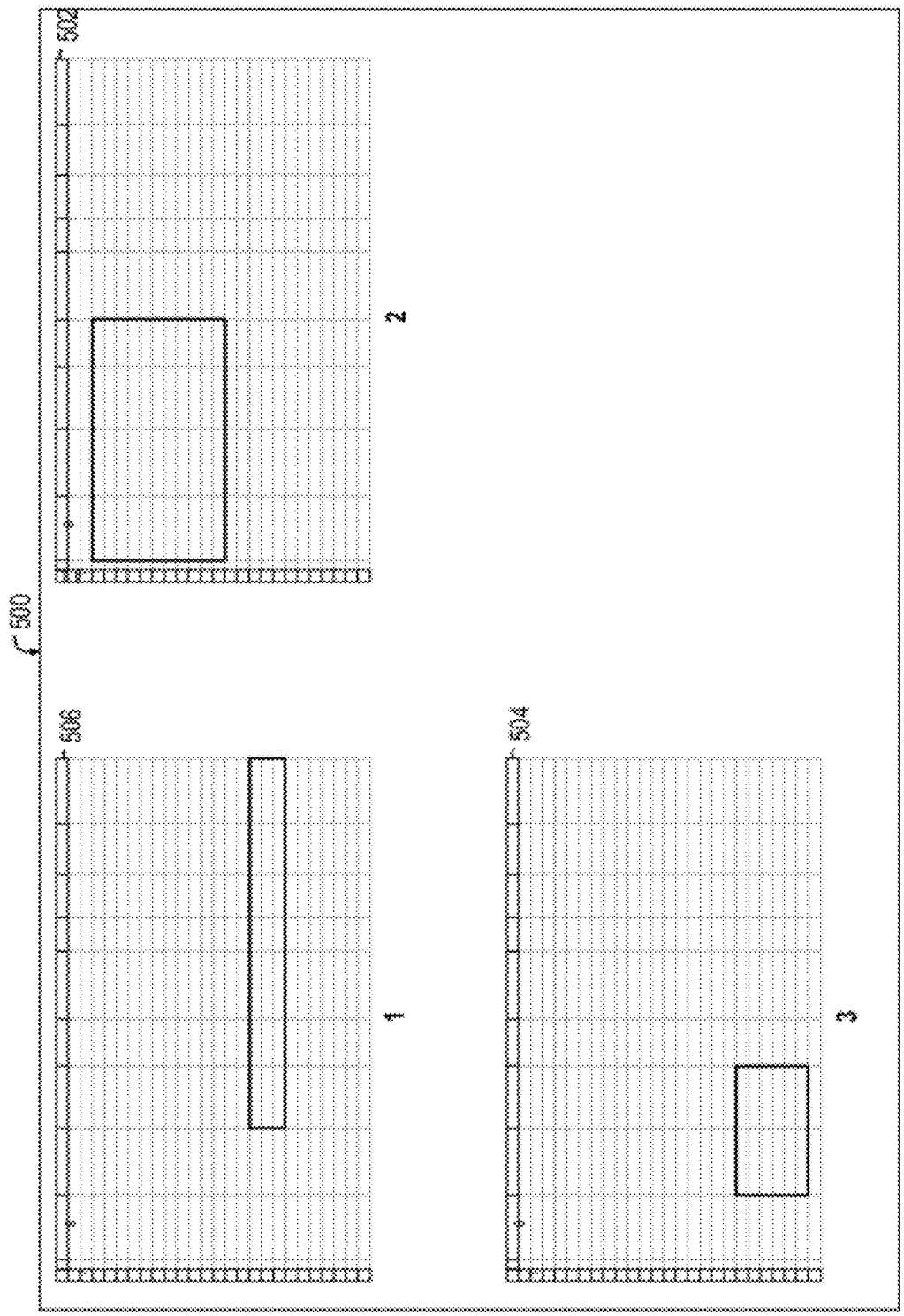

FIGS. 5A-5C are representations of an additional and/or alternative graphical tool 500 that may be used to request changes to stack positions (or priorities) associated with items in an electronic spreadsheet, in accordance with some embodiments. In some embodiments, the graphical tool 500 may be accessed by activating a graphical tool in a view that includes the electronic spreadsheet 202 and/or by simultaneously pressing the ALT+CTRL+TAB and/or some other combination of keys on a keyboard for a user device.

Referring to FIG. 5A, the graphical tool 500 includes a plurality of representations, e.g., representations 502-506. Each of the plurality of representations is associated with a respective one of the plurality of items in a spreadsheet, e.g., the spreadsheet 202 in FIG. 2E, and may indicate the spreadsheet location associated with such respective one of the plurality of items in the spreadsheet. For example, in the illustrated embodiment, the first representation 502 is associated with the first item 221 and may indicate the spreadsheet location associated with the first item 221. The second representation 504 is associated with the second item 261 and may indicate the spreadsheet location associated with the first item 261. The third representation 506 is associated with the third item 281 and may indicate the spreadsheet location associated with the third item 281. In some embodiments, each representation comprises a representation of the spreadsheet, the associated item and the location of the associated item in the spreadsheet.

The plurality of representations, e.g., representations 502-506, may be arranged in a sequence that is based on the relative stack positions of the associated plurality of items in the spreadsheet. For example, the first representation 502 may be positioned first in the sequence because it is associated with the first item 221, which is associated with the highest stack position (or priority). The second representation 504 may be positioned second in the sequence because it is associated with the second item 261, which is associated with the second highest stack position (or priority). The third representation 506 may be positioned third in the sequence because it is associated with the third item 281, which is associated with the third highest stack position (or priority).

Referring to FIG. 5B, a change to a stack position, e.g., the change in FIG. 2F, may be requested by dragging the representation, e.g., the third representation 506, (or an icon associated therewith) that is associated with the item for which the position is to be changed, e.g., the third item 281, to a position corresponding to the desired stack position, e.g., first in the sequence.

Dragging may comprise positioning a mouse cursor 510 onto the representation associated with an item for which the respective stack position is to be changed, e.g., the third item 281, by pressing a left mouse button and then moving the mouse to a desired position while maintaining the pressing of the mouse button.

Referring to FIG. 5C, after the change is requested, the representations may be arranged in a new sequence that is in accordance with the requested change. For example, the third representation 506 may be positioned first in the sequence because it is associated with the third item 281, which after the change is associated with the highest stack position (or priority). The first representation 502 may be positioned second in the sequence because it is associated with the first item 221, which after the change is associated with the second highest stack position (or priority). The second representation 504 may be positioned third in the sequence because it is associated with the second item 261, which after the change is associated with the third highest stack position (or priority).

Figure 6A:
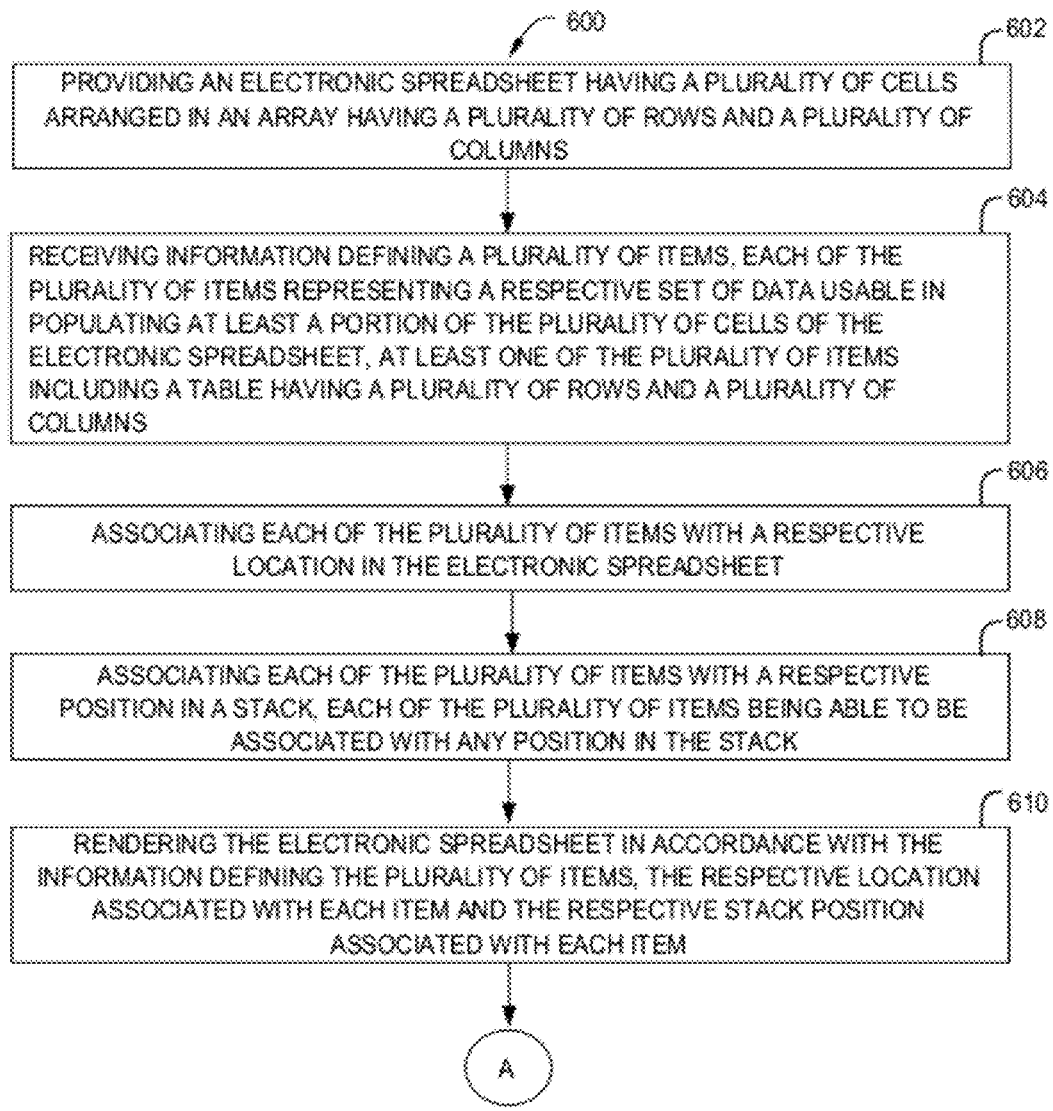

FIGS. 6A-6B are a flow chart 600 of a method according to some embodiments.

In some embodiments, one or more portions of the method may be performed by one or more user devices, e.g., one or more of user devices 122-126. In some embodiments, one or more portions of the method may be performed in association with an electronic spreadsheet application program executed by a processor within the one or more of the one or more user devices.

The method (or portion(s) thereof) may be performed using hardware, software (which may include low level language code and/or high language code) and/or any combination thereof. For that matter, any of the methods (or portion(s) thereof) described herein may be performed using hardware, software (which may include low level language code and/or high language code) or any combination thereof. In some embodiments, a storage medium may store thereon instructions that when executed by a machine result in performance of one or more portions of the method.

The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

Referring to FIGS. 6A-6B, at 602, the method may include providing an electronic spreadsheet having a plurality of cells arranged in an array having a plurality of rows and a plurality of columns.

At 604, the method may further include receiving information defining a plurality of items, each of the plurality of items representing a respective set of data usable in populating at least a portion of the plurality of cells of the electronic spreadsheet, at least one of the plurality of items including a table having a plurality of rows and a plurality of columns. In some embodiments, two or more of the plurality of items include a table having a plurality of rows and a plurality of columns. In some embodiments, all of the items include a table having a plurality of rows and a plurality of columns.

At 606, the method may further include associating each of the plurality of items with a respective location in the electronic spreadsheet.

At 608, the method may further include associating each of the plurality of items with a respective position in a stack.

At 610, the method may further include rendering the electronic spreadsheet in accordance with the information defining the plurality of items, the respective location associated with each item and the respective stack position associated with each item. This may include populating at least a portion of the plurality of cells of the electronic spreadsheet in accordance with the information defining the plurality of items, the respective location associated with each item and the respective stack position associated with each item. The populating may include using a one of the plurality of items having a highest stack position in populating each of the plurality of cells that are overlapped by (i.e., located at positions that correspond with the position of) the one of the plurality of items having the highest stack position (or priority); and using a one of the plurality of items having a second highest stack position in populating each of the plurality of cells that are overlapped by the one of the plurality of items having the second highest stack position but not overlapped by the one of the plurality of items having the highest stack position.

The method may further include using a one of the plurality of items having a third highest stack position in populating each of the plurality of cells that are overlapped by the one of the plurality of items having the third highest stack position but not overlapped by the one of the plurality of items having the highest stack position and not overlapped by the one of the plurality of items having the second highest stack position. And so on.

In some embodiments, the highest stack position (or priority) may correspond to a maximum position in the stack. In some other embodiments, the highest stack position (or priority) may correspond to a minimum position in the stack.

At 612, the method may further include receiving a request to change the stack position associated with one of the plurality of items; changing the stack position associated with the one of the plurality of items and the respective stack position of at least one other item of the plurality of items based at least in part on the request to change the stack position associated with the one of the plurality of items; and after the changing the stack position associated with the one of the plurality of items and the respective stack position of at least one other item of the plurality of items, re-rendering at least a portion of the electronic spreadsheet in accordance with the information defining the plurality of items, the respective location associated with each item and the respective stack position associated with each item.

Notably, some embodiments may employ one or more sub portions of the portion of the method at 612 without one or more other sub portions of the portion of the method at 612. For that matter, in some embodiments, one or more sub portions of any given portion of the method may be employed without one or more other sub portions of such given portion of the method.

At 614, the method may further include receiving a request to change the location associated with one of the plurality of items such that the location of one of the plurality of items overlaps the location of at least one other item of the plurality of items; changing the location associated with the one of the plurality of items such that the location of one of the plurality of items overlaps the location of at least one other item of the plurality of items; determining a portion of the at least one other item of the plurality of items that is overlapped by the one of the plurality of items; after the changing the location associated with the one of the plurality of items such that the location of one of the plurality of items overlaps the location of at least one other item of the plurality of items, re-rendering at least a portion of the electronic spreadsheet in accordance with the information defining the plurality of items, the respective location associated with each item and the respective stack position associated with each item; and after the re-rendering at least a portion of the electronic spreadsheet, retaining the portion of the at least one other item of the plurality of items that is overlapped by the one of the plurality of items.

As indicated above, some embodiments may employ one or more sub portions of the portion of the method at 614 without one or more other sub portions of the portion of the method at 614.

Figure 7:
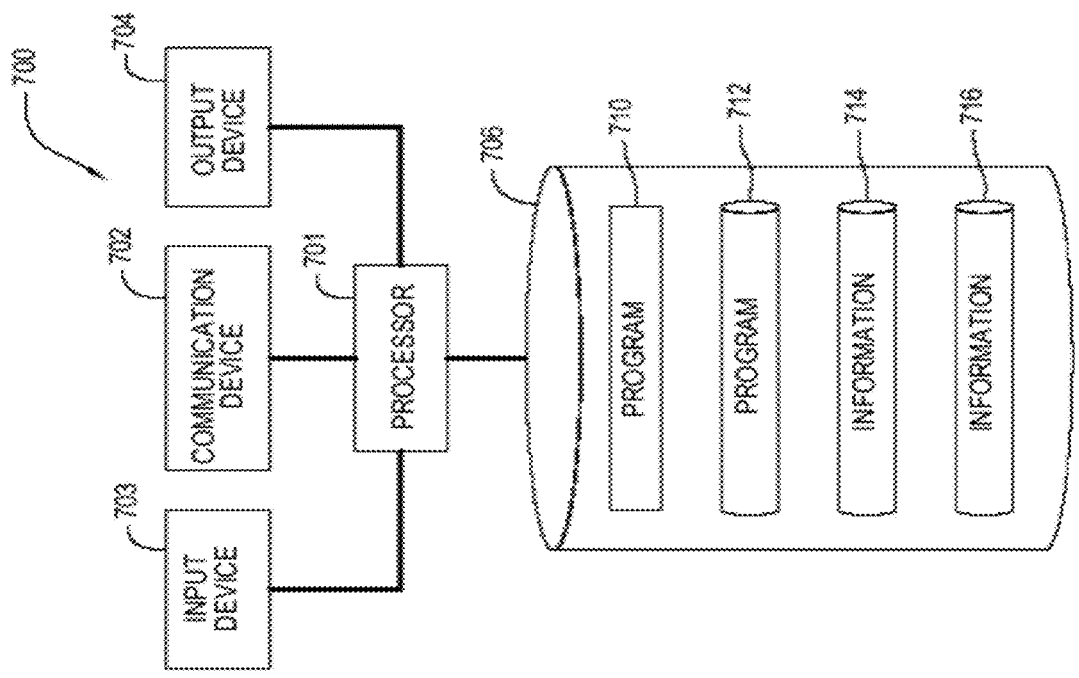
FIG. 7 is a block diagram of a processing system, in accordance with some embodiments.

FIG. 7 is a block diagram of processing system 700 according to some embodiments. In some embodiments, one or more of the systems (or portion(s) thereof) disclosed herein, one or more apparatus (or portion(s) thereof) disclosed herein and/or one or more devices (or portion(s) thereof) disclosed herein may have an architecture that is the same as and/or similar to the architecture of the processing system 700 (or portion(s) thereof). In some embodiments, one or more of the methods (or portion(s) thereof) disclosed herein may be performed by systems, apparatus and/or devices having an architecture that is the same as and/or similar to the architecture of processing system 700 (or portion(s) thereof).

Referring to FIG. 7, in accordance with some embodiments, the processing system 700 includes a processor 701 coupled to a communication device 702, an input device 703, an output device 704 and a storage device 706.

In some embodiments, the processor 701 may execute processor-executable program code to provide or otherwise result in one or more portions of one or more functions and/or one or more portions of one or more methods disclosed herein. In some embodiments, the processor 701 may comprise one or more INTEL® Pentium® processors.

The communication device 702 may be used to facilitate communication with other devices and/or systems. In some embodiments, communication device 702 may comprise an Ethernet and/or other type of connection to a network and/or resource and through which processing system 700 may receive and/or transmit information.

The input device 703 may be used to input information. In some embodiments, the input device 703 may comprise a keyboard, a keypad, a track ball, a touchpad, a mouse or other pointing device, a microphone, a knob or a switch, an infrared (IR) port and/or a computer media reader.

The output device 704 may be used to output information. In some embodiments, the output device 704 may comprise an IR port, a docking station, a display, a speaker and/or a printer.

The storage device 706 may store one or more programs 710-712 and/or other information for operation of the processing system 700. In some embodiments, the one or more programs and/or other information may include one or more operating systems, one or more database management systems and/or other applications for operation of the processing system 700. In some embodiments, the one or more programs 710-712 may include one or more instructions to be executed by the processor 701 to provide one or more portions of one or more functions and/or one or more portions of one or more methods disclosed herein. In some embodiments, the one or more programs and/or other information may include one or more databases 714-716.

In some embodiments, the storage device 706 may comprise one or more storage devices, such as, for example, magnetic storage devices (e.g., magnetic tape and/or hard disk drives), optical storage devices, and/or semiconductor memory devices such as Random Access Memory (RAM) devices and Read Only Memory (ROM) devices.

In some embodiments, one or more portions of one or more embodiments disclosed herein may be embodied in a system, a method, an apparatus and/or a computer-readable storage medium.

In some embodiments, one or more (i.e., some or all) portions of any embodiment disclosed herein may be performed by a processor.

In some embodiments, one or more portions of any embodiment disclosed herein may result from a processor executing instructions.

In some embodiments, a computer-readable storage medium may store thereon instructions that when executed by a processor result in performance of one or more portions of one or more embodiments disclosed herein.

A computer-readable storage medium may store thereon instructions that when executed by a processor (or multiple processors) result in performance of a process according to any of the embodiments described herein.

In some embodiments, some or all portions of the data and/or information described in herein may be stored in one or more storage devices.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

In addition, unless stated otherwise, terms such as, for example, "in response to", "in accordance with" and "based on" mean "in response at least to" "in accordance at least with" and "based at least on", respectively, so as not to preclude being responsive to, in accordance with and/or based on, more than one thing.

In addition, unless stated otherwise, a "user device" may comprise any type of device that may be used by a user. Thus, a user device may have any form factor and may not be owned by and/or assigned to a user.

In addition, unless stated otherwise, a "database" may comprise one or more related or unrelated databases.

In addition, unless stated otherwise, data may comprise any type of information and may have and/or be stored in any form. In some embodiments, data may be stored in raw, excerpted, summarized and/or analyzed form.

Unless stated otherwise, a processing system may comprise any type of processing system. For example, a processing system may be programmable or non programmable, general purpose or special purpose, dedicated or non dedicated, distributed or non distributed, shared or not shared, and/or any combination thereof. A processing system may include, but is not limited to, hardware, software, firmware, and/or any combination thereof. Hardware may include, but is not limited to off the shelf integrated circuits, custom integrated circuits and/or any combination thereof. In some embodiments, a processing system will include at least one processor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. In some embodiments, a processing system will include at least one processor that executes instructions stored on the computer readable medium. A processing system may employ continuous signals, periodically sampled signals, and/or any combination thereof. If a processor is distributed, two or more portions of the processor may communicate with one another through a communication link.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. In some embodiments, a processing may execute instructions stored on the computer readable medium. A processor may employ continuous signals, periodically sampled signals, and/or any combination thereof. If a processor is distributed, two or more portions of the processor may communicate with one another through a communication link.

In addition, unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols.

While various embodiments have been described, such description should not be interpreted in a limiting sense. It is to be understood that other embodiments may be practiced without departing from the spirit and scope of the invention, as recited in the claims appended hereto.

What is claimed is:

1. A method comprising:
   providing an electronic spreadsheet having a plurality of cells arranged in an array having a plurality of rows and a plurality of columns;
   receiving information defining a plurality of items, each of the plurality of items representing a respective set of data usable in populating at least a portion of the plurality of cells of the electronic spreadsheet, at least one of the plurality of items including a table having a plurality of rows and a plurality of columns;
   associating each of the plurality of items with a respective location in the electronic spreadsheet;

associating each of the plurality of items with a respective position in a stack, each of the plurality of items being able to be associated with any position in the stack; and rendering the electronic spreadsheet in accordance with the information defining the plurality of items, the respective location associated with each item and the respective stack position associated with each item;

wherein the rendering comprises:

populating at least a portion of the plurality of cells of the electronic spreadsheet in accordance with the information defining the plurality of items, the respective location associated with each item and the respective stack position associated with each item; and providing a view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position;

the method further comprising:

during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, receiving a request to change the stack position of the second one of the plurality of items from the second highest stack position to the highest stack position; and after the receiving of the request during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, providing a view showing the second one of the plurality of items as having the highest stack position and overlapping the first one of the plurality of items shown as having the second highest stack position.

2. The method of claim 1 wherein the providing a view showing the second one of the plurality of items as having the highest stack position and overlapping the first one of the plurality of items shown as having the second highest stack position comprises:

changing the stack position associated with the first one of the plurality of items and the stack position associated with the second one of the plurality of items; and after the changing the stack position associated with the first one of the plurality of items and the stack position associated with the second one of the plurality of items, re-rendering at least a portion of the electronic spreadsheet in accordance with the information defining the plurality of items, the respective location associated with each item and the respective stack position associated with each item.

3. The method of claim 1 further comprising:

receiving a request to change the location associated with the first one of the plurality of items such that the location of the first one of the plurality of items overlaps the location associated with the second one of the plurality of items;

changing the location associated with the first one of the plurality of items such that the location of the first one of the plurality of items overlaps the location associated with the second one of the plurality of items;

determining a portion of the second one of the plurality of items that is overlapped by the first one of the plurality of items;

after the changing the location associated with the first one of the plurality of items such that the location of the first one of the plurality of items overlaps the location associated with the second one of the plurality of items, re-rendering at least a portion of the electronic spreadsheet in accordance with the information defining the plurality of items, the respective location associated with each item and the respective stack position associated with each item; and after the re-rendering at least a portion of the electronic spreadsheet, retaining the portion of the second one of the plurality of items that is overlapped by the first one of the plurality of items.

4. The method of claim 1 wherein at least two of the plurality of items include a table having a plurality of rows and a plurality of columns.

5. The method of claim 1 wherein all of the plurality of items include a table having a plurality of rows and a plurality of columns.

6. The method of claim 1 further comprising:

changing the location associated with the first one of the plurality of items relative to the location associated with the second one of the plurality of items without changing the stack position associated with the first one of the plurality of items and without changing the stack position associated with the second one of the plurality of items.

7. The method of claim 1 wherein the first one of the plurality of items includes a table having a schema; and wherein the second one of the plurality of items includes a table having a schema different than the schema of the table included in the first one of the plurality of items.

8. The method of claim 1 wherein the first one of the plurality of items shown having the highest position in the stack has a first state in which the location of the first one of the plurality of items shown having the highest position in the stack overlaps the location of the second one of the plurality of items shown having the second highest position in the stack but does not overlap the location of a third one of the plurality of items shown having a third highest position in the stack; and wherein the first one of the plurality of items shown having the highest position in the stack has a second state in which the location of the first one of the plurality of items shown having the highest position in the stack overlaps the location of the third one of the plurality of items shown having the third highest position in the stack.

9. The method of claim 1, wherein the plurality of cells of the electronic spreadsheet that are overlapped by: (i) the second one of the plurality of items shown having the second highest stack position and (ii) no item having the highest stack position, are overlapped by nothing above the second highest stack position.

10. The method of claim 1, wherein the populating at least a portion of the plurality of cells of the electronic spreadsheet in accordance with the information defining the plurality of items, the respective location associated with each item and the respective stack position associated with each item comprises:
 using the first one of the plurality of items shown having the highest stack position in populating each of the plurality of cells of the electronic spreadsheet that are overlapped by the first one of the plurality of items shown having the highest stack position; and
 using the second one of the plurality of items shown having the second highest stack position in populating each of the plurality of cells of the electronic spreadsheet that are overlapped by: (i) the second one of the plurality of items shown having the second highest stack position and (ii) no item having the highest stack position.

11. The method of claim 1,
 wherein the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, shows no other item as both having a highest stack position and overlapping a plurality of the cells and shows no other item as both having a second highest stack position and overlapping a plurality of the cells.

12. A computer readable storage medium having instructions stored thereon, the instructions being executable by a machine to result in a method comprising:
 providing an electronic spreadsheet having a plurality of cells arranged in an array having a plurality of rows and a plurality of columns;
 receiving information defining a plurality of items, each of the plurality of items representing a respective set of data usable in populating at least a portion of the plurality of cells of the electronic spreadsheet, at least one of the plurality of items including a table having a plurality of rows and a plurality of columns;
 associating each of the plurality of items with a respective location in the electronic spreadsheet;
 associating each of the plurality of items with a respective position in a stack, each of the plurality of items being able to be associated with any position in the stack; and
 rendering the electronic spreadsheet in accordance with the information defining the plurality of items, the respective location associated with each item and the respective stack position associated with each item;
 wherein the rendering comprises:
  populating at least a portion of the plurality of cells of the electronic spreadsheet in accordance with the information defining the plurality of items, the respective location associated with each item and the respective stack position associated with each item; and
  providing a view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position;
 the method further comprising:
  during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, receiving a request to change the stack position of the second one of the plurality of items from the second highest stack position to the highest stack position; and
  after the receiving of the request during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, providing a view showing the second one of the plurality of items as having the highest stack position and overlapping the first one of the plurality of items shown as having the second highest stack position.

13. The computer readable storage medium of claim 12, wherein the providing a view showing the second one of the plurality of items as having the highest stack position and overlapping the first one of the plurality of items shown as having the second highest stack position comprises:
 changing the stack position associated with the first one of the plurality of items and the stack position associated with the second one of the plurality of items; and
 after the changing the stack position associated with the one of the plurality of items and the stack position associated with the second one of the plurality of items, re-rendering at least a portion of the electronic spreadsheet in accordance with the information defining the plurality of items, the respective location associated with each item and the respective stack position associated with each item.

14. The computer readable storage medium of claim 12, the method further comprising:
 receiving a request to change the location associated with the first one of the plurality of items such that the location of the first one of the plurality of items overlaps the location associated with the second one of the plurality of items;
 changing the location associated with the first one of the plurality of items such that the location of the first one of the plurality of items overlaps the location associated with the second one of the plurality of items;
 determining a portion of the second one of the plurality of items that is overlapped by the first one of the plurality of items;
 after the changing the location associated with the first one of the plurality of items such that the location of the first one of the plurality of items overlaps the location associated with the second one of the plurality of items, re-rendering at least a portion of the electronic spreadsheet in accordance with the information defining the plurality of items, the respective location associated with each item and the respective stack position associated with each item; and after the re-rendering at least a portion of the electronic spreadsheet, retaining the portion of the second one of the plurality of items that is overlapped by the first one of the plurality of items.

15. The computer readable storage medium of claim 12 wherein at least two of the plurality of items include a table having a plurality of rows and a plurality of columns.

16. The computer readable storage medium of claim 12, the method further comprising:
changing the location associated with the first one of the plurality of items relative to the location associated with the second one of the plurality of items without changing the stack position associated with the first one of the plurality of items and without changing the stack position associated with the second one of the plurality of items.

17. The computer readable storage medium of claim 12, wherein the first one of the plurality of items includes a table having a schema; and
wherein the second one of the plurality of items includes a table having a schema different than the schema of the table included in the first one of the plurality of items.

18. The computer readable storage medium of claim 12, wherein the first one of the plurality of items shown having the highest position in the stack has a first state in which the location of the first one of the plurality of items shown having the highest position in the stack overlaps the location of the second one of the plurality of items shown having the second highest position in the stack but does not overlap the location of a third one of the plurality of items having a third highest position in the stack; and
wherein the first one of the plurality of items shown having the highest position in the stack has a second state in which the location of the first one of the plurality of items shown having the highest position in the stack overlaps the third location of the one of the plurality of items shown having the third highest position in the stack.

19. The computer readable storage medium of claim 12, wherein the plurality of cells of the electronic spreadsheet that are overlapped by: (i) the second one of the plurality of items shown having the second highest stack position and (ii) no item having the highest stack position, are overlapped by nothing above the second highest stack position.

20. The computer readable storage medium of claim 12, wherein the populating at least a portion of the plurality of cells of the electronic spreadsheet in accordance with the information defining the plurality of items, the respective location associated with each item and the respective stack position associated with each item comprises:
using the first one of the plurality of items shown having the highest stack position in populating each of the plurality of cells of the electronic spreadsheet that are overlapped by the first one of the plurality of items shown having the highest stack position; and
using the second one of the plurality of items having the second highest stack position in populating each of the plurality of cells of the electronic spreadsheet that are overlapped by: (i) the second one of the plurality of items shown having the second highest stack position and (ii) no item having the highest stack position.

21. The computer readable storage medium of claim 12, wherein the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, shows no other item as both having a highest stack position and overlapping a plurality of the cells and shows no other item as both having a second highest stack position and overlapping a plurality of the cells.

22. Apparatus comprising:
a processing system that includes at least one processor and is configured to: provide an electronic spreadsheet having a plurality of cells arranged in an array having a plurality of rows and a plurality of columns, receive information defining a plurality of items, each of the plurality of items representing a respective set of data usable in populating at least a portion of the plurality of cells of the electronic spreadsheet, at least one of the plurality of items including a table having a plurality of rows and a plurality of columns; associate each of the plurality of items with a respective location in the electronic spreadsheet; associate each of the plurality of items with a respective position in a stack, each of the plurality of items being able to be associated with any position in the stack; and render the electronic spreadsheet in accordance with the information defining the plurality of items, the respective location associated with each item and the respective stack position associated with each item;
wherein the processing system is configured to render the electronic spreadsheet by:
populating at least a portion of the plurality of cells of the electronic spreadsheet in accordance with the information defining the plurality of items, the respective location associated with each item and the respective stack position associated with each item; and
providing a view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position;
wherein the processing system is further configured to:
during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, receive a request to change the stack position of the second one of the plurality of items from the second highest stack position to the highest stack position; and
after the receiving of the request during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii)

no item having the highest stack position, provide a view showing the second one of the plurality of items as having the highest stack position and overlapping the first one of the plurality of items shown as having the second highest stack position.

23. The apparatus of claim 22, the processing system wherein the provide a view showing the second one of the plurality of items as having the highest stack position and overlapping the first one of the plurality of items shown as having the second highest stack position comprises:
change the stack position associated with the first one of the plurality of items and the stack position associated with the second one of the plurality of items, and
after the change to the stack position associated with the one of the plurality of items and the stack position associated with the second one of the plurality of items, re-render at least a portion of the electronic spreadsheet in accordance with the information defining the plurality of items, the respective location associated with each item and the respective stack position associated with each item.

24. The apparatus of claim 22, the processing system further configured to receive a request to change the location associated with the first one of the plurality of items such that the location of the first one of the plurality of items overlaps the location associated with the second one of the plurality of items, change the location associated with the first one of the plurality of items such that the location of the first one of the plurality of items overlaps the location associated with the second one of the plurality of items, determine a portion of the second one of the plurality of items that is overlapped by the first one of the plurality of items, after the change to the location associated with first the one of the plurality of items such that the location of the first one of the plurality of items overlaps the location associated with the second one of the plurality of items, re-render at least a portion of the electronic spreadsheet in accordance with the information defining the plurality of items, the respective location associated with each item and the respective stack position associated with each item, and after the re-render of the at least a portion of the electronic spreadsheet, retain the portion of the second one of the plurality of items that is overlapped by the first one of the plurality of items.

25. The apparatus of claim 22 wherein at least two of the plurality of items include a table having a plurality of rows and a plurality of columns.

26. The apparatus of claim 22, the processing system further to change the location associated with the first one of the plurality of items relative to the location associated with the second one of the plurality of items without changing the stack position associated with the first one of the plurality of items and without changing the stack position associated with the second one of the plurality of items.

27. The apparatus of claim 22, wherein the first one of the plurality of items includes a table having a schema; and
wherein the second one of the plurality of items includes a table having a schema different than the schema of the table included in the first one of the plurality of items.

28. The apparatus of claim 22, wherein the first one of the plurality of items shown having the highest position in the stack has a first state in which the location of the first one of the plurality of items shown having the highest position in the stack overlaps the location of the second one of the plurality of items shown having the second highest position in the stack but does not overlap the location of a third one of the plurality of items having a third highest position in the stack; and wherein the first one of the plurality of items shown having the highest position in the stack has a second state in which the location of the first one of the plurality of items shown having the highest position in the stack overlaps the location of the third one of the plurality of items shown having the third highest position in the stack.

29. The apparatus of claim 22, wherein the plurality of cells of the electronic spreadsheet that are overlapped by: (i) the second one of the plurality of items shown having the second highest stack position and (ii) no item having the highest stack position, are overlapped by nothing above the second highest stack position.

30. The apparatus of claim 22, wherein the processing system is configured to use the first one of the plurality of items shown having the highest stack position in populating each of the plurality of cells that are overlapped by the first one of the plurality of items shown having the highest stack position, and to use the second one of the plurality of items having the second highest stack position in populating each of the plurality of cells that are overlapped by: (i) the second one of the plurality of items shown having the second highest stack position and (ii) no item having the highest stack position.

31. The apparatus of claim 22,
wherein the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, shows no other item as both having a highest stack position and overlapping a plurality of the cells and shows no other item as both having a second highest stack position and overlapping a plurality of the cells.

32. A method comprising:
providing an electronic spreadsheet having a plurality of cells arranged in an array having a plurality of rows and a plurality of columns;
receiving information defining a plurality of items, each of the plurality of items representing a respective set of data usable in populating at least a portion of the plurality of cells of the electronic spreadsheet,
associating each of the plurality of items with a respective location within the array in which the plurality of cells are arranged, at least one of the plurality of items including a table having a plurality of rows and a plurality of columns, a first one of the plurality of items further including a graphical tool activatable by a user to indicate a request to expand the item;
associating each of the plurality of items with a respective position in a stack, each of the plurality of items being able to be associated with any position in the stack; and
rendering the electronic spreadsheet in accordance with the information defining the plurality of items the respective location associated with each item and the respective stack position associated with each item;
after the rendering of the electronic spreadsheet in accordance with the information defining the plurality of items the respective location associated with each item and the respective stack position associated with each item, receiving an indication that a user has activated the graphical tool included in the first one of the plurality of items;

expanding the first one of the plurality of items in response to the indication that the user has activated the graphical tool included in the first one of the plurality of items;

providing a view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position;

during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, receiving a request to change the stack position of the second one of the plurality of items from the second highest stack position to the highest stack position; and after the receiving of the request during the providing of the view showing both: (a) a first one of the plurality of items having a highest stack position and overlapping both: (i) a second one of the plurality of items having a second highest stack position and (ii) a plurality of the cells of the electronic spreadsheet, and (b) a plurality of the cells of the electronic spreadsheet as overlapped by: (i) the second one of the plurality of items having the second highest stack position and (ii) no item having the highest stack position, providing a view showing the second one of the plurality of items as having the highest stack position and overlapping the first one of the plurality of items shown as having the second highest stack position.

33. The method of claim 32, wherein the plurality of cells of the electronic spreadsheet that are overlapped by: (i) the second one of the plurality of items shown having the second highest stack position and (ii) no item having the highest stack position, are overlapped by nothing above the second highest stack position.

\* \* \* \* \*